(12) United States Patent
Stensvad et al.

(10) Patent No.: US 8,663,537 B2
(45) Date of Patent: Mar. 4, 2014

(54) INJECTION MOLDING APPARATUS AND METHOD

(75) Inventors: Karl K. Stensvad, Inver Grove Heights, MN (US); Stanley Rendon, Eagan, MN (US); Paul A. Martinson, Maplewood, MN (US); Samuel Kidane, St. Paul, MN (US); Thomas Herdtle, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 127 days.

(21) Appl. No.: 13/474,938

(22) Filed: May 18, 2012

(65) Prior Publication Data

US 2013/0307189 A1  Nov. 21, 2013

(51) Int. Cl.
 *B29C 45/73* (2006.01)
(52) U.S. Cl.
 USPC ..................................... 264/328.16; 425/552
(58) Field of Classification Search
 USPC ................. 264/328.14, 328.16; 425/547, 552
 See application file for complete search history.

(56) References Cited

U.S. PATENT DOCUMENTS

| | | | |
|---|---|---|---|
| 4,966,544 A | 10/1990 | Mitake | |
| 5,232,653 A | 8/1993 | Addeo | |
| 5,376,317 A | 12/1994 | Maus | |
| 5,423,670 A * | 6/1995 | Hamel | 425/144 |
| 5,452,999 A | 9/1995 | Evans | |
| 5,653,907 A | 8/1997 | Kendall | |
| 5,775,402 A | 7/1998 | Sachs | |
| 5,830,515 A * | 11/1998 | Pleasant et al. | 425/192 R |
| 5,855,933 A | 1/1999 | Schmetz | |
| 6,079,971 A | 6/2000 | Ramond | |
| 6,104,006 A | 8/2000 | Kimura | |
| 6,145,804 A | 11/2000 | Baumann | |
| 6,196,821 B1 | 3/2001 | Chen | |
| 6,290,882 B1 | 9/2001 | Maus | |
| 6,739,858 B2 | 5/2004 | Krohn | |
| 6,936,206 B1 | 8/2005 | Satoh | |
| 7,195,223 B2 | 3/2007 | Manuel | |
| 2002/0014722 A1 | 2/2002 | Baresich | |
| 2002/0162940 A1 | 11/2002 | Frul | |
| 2004/0151937 A1 | 8/2004 | Hutchinson | |
| 2005/0064061 A1 | 3/2005 | Eichlseder | |
| 2005/0276875 A1 | 12/2005 | Lee | |

(Continued)

FOREIGN PATENT DOCUMENTS

| | | |
|---|---|---|
| CN | 1944028 | 4/2007 |
| CN | 101100106 | 1/2008 |

(Continued)

OTHER PUBLICATIONS

Stephens, Lyndon S., et al., "A Pin Fin Microheat Sink for Cooling Macroscale Conformal Surfaces Under the Influence of Thrust and Frictional Forces," Journal of Microelectromechanical Systems, Jun. 2001, vol. 10, No. 2, pp. 222-231.

(Continued)

*Primary Examiner* — Jill Heitbrink
(74) *Attorney, Agent, or Firm* — Kenneth B. Wood

(57) ABSTRACT

A heatsink for use in injection molding, with at least one load-bearing path with a rearward segment, wherein at least a portion of at least one non-load-bearing, dynamic heat-transfer zone of the heatsink is laterally offset from the rearward segment of the load-bearing path.

34 Claims, 5 Drawing Sheets

(56) References Cited

U.S. PATENT DOCUMENTS

| | | |
|---|---|---|
| 2006/0145397 A1 | 7/2006 | Steil |
| 2007/0042075 A1 | 2/2007 | Cavallaro |
| 2007/0092595 A1 | 4/2007 | Yoshino |
| 2007/0108668 A1 | 5/2007 | Hutchinson |
| 2007/0120297 A1 | 5/2007 | Wieder |
| 2007/0191761 A1 | 8/2007 | Boone |
| 2007/0284074 A1 | 12/2007 | Morooka |
| 2008/0088066 A1 | 4/2008 | Ferguson |
| 2008/0111280 A1 | 5/2008 | Choe |
| 2009/0169410 A1 | 7/2009 | Slaton |
| 2009/0226556 A1 | 9/2009 | Lin |
| 2010/0230575 A1 | 9/2010 | Mironov |

FOREIGN PATENT DOCUMENTS

| | | |
|---|---|---|
| CN | 201077144 | 6/2008 |
| CN | 201158129 | 12/2008 |
| CN | 100558536 | 11/2009 |
| CN | 101733914 A | 6/2010 |
| CN | 101733915 A | 6/2010 |
| CN | 201721022 | 1/2011 |
| DE | 19533045 | 3/1997 |
| EP | 1 469 513 | 10/2004 |
| EP | 2045065 | 4/2009 |
| JP | 2005324503 | 11/2005 |
| JP | 2008149372 | 7/2008 |
| JP | 2010125662 | 6/2010 |
| KR | 100450641 | 10/2004 |
| KR | 20080104595 | 12/2008 |
| TW | 201012627 | 9/1997 |
| WO | WO2007121934 A1 | 11/2007 |
| WO | 2008-075328 | 6/2008 |
| WO | WO200984762 A1 | 7/2009 |
| WO | WO2010103471 A2 | 9/2010 |

OTHER PUBLICATIONS

International Search Report, PCT/2013/039073, mailed Sep. 17, 2013, 7 pages.

Saito, et al., "A New Concept of Active Temperature Control for an Injection Molding Process Using Infrared Radiation Heating", Polymer Engineering and Science, Dec. 2002, vol. 42, No. 12, pp. 2418-2429.

Nardin, et al., "Adaptive system for electrically driven thermoregulation of moulds for injection moulding", Journal of Materials Processing Technology, 187-188, 2007, pp. 690-693.

Zagar, et al., "An Adaptive System for Cooling Injection-Moulding Moulds Via Thermoelectric Modules", Journal of Mechanical Engineering, 52, 2006, 10, pp. 630-644.

Choi, et al., "Conformal Cooling Channel Designs to Reduce Temperature Deviation by Using Constructal Design", Society of Plastics Engineers, ANTEC 2010, pp. 1456-1471.

"Cut part costs thermodynamically", PlasticsToday.com, http://www.plasticstoday.com/articles/cut-part-costs-thermodynamically, Jul. 31, 2007, 3 pages.

Xu, et al., "Design Tools for Rapid Thermal Cycling", Department of Mechanical Engineering, Department of Material Science and Engineering, Massachusetts Institute of Technology Cambridge, MA 02139, 1986, 6 pages.

Hatch, et al., "Dynamic Cooling Design for Injection Molding", University of Massachusetts Amherst, 5 pages, 2001.

Masood, et al., "Melt Flow Analysis of Abs in Fused Deposition Modelling Process", Society of Plastics Engineers, ANTEC 2009, pp. 1355-1370.

Chen, et al. "Effect of Processing Parameters on Pulse Cooling Efficiency in Injection Molding", Society of Plastics Engineers, ANTEC 2010, pp. 734-776.

Chen, et al., "Efficiencies of Various Mold Surface Temperature Controls and Their Effects on the Qualities of Injection Molded Parts", Society of Plastics Engineers, ANTEC 2006, pp. 1280-1284.

Michaeli, et al., "Modelling the Non-Linear Viscoelastic and Locally Distributed Material Behavior of Semi-Crystalline Thermoplastics", Society of Plastics Engineers, ANTEC 2009, pp. 2454-2490.

McCalla, et al., "Evaluation of Pulsed Cooling in Injection Mould Tools", Society of Plastics Engineers, ANTEC 2003, pp. 612-615.

Chang, et al. "Experimental Investigation of Infrared Rapid Surface Heating for Injection Molding" Journal of Applied Polymer Science, 2006, vol. 102, pp. 3704-3713.

Jaroschek, et al., "Hot and Cold Molds", Bielefeld University of Applied Science, Jun. 16, 2010, 6 pages.

Knights, et al., "Hot/Cold Thermal Cycling of Injection Molds Heats Up", Plastics Technology, Apr. 2010, 4 pages.

Chiou, et al., "Thermal Feature of Variotherm Mold in Injection Molding Processes", Society of Plastics Engineering, ANTEC 2009, pp. 2491-2510.

Kim, et al., "Injection Molding Nanoscale Features with the Aid of induction Heating", Polymer-Plastics Technology and Engineering, vol. 46, 2007, pp. 1031-1037.

Chiou, et al., "Integrated True 3d Simulation of Rapid Heat Cycle Molding Process", CoreTech System Co., Ltd., 2007, 4 pages.

Chen, et al., "Study on the Electrical Conductivity of Bipolar Plate With Different Molding Processes Used for Fuel Cell", Society of Plastics Engineering, ANTEC 2010, pp. 733-759.

Yu, et al., "Micro-injection molding with the infrared assisted mold heating system", Materials Science and Engineering A 460-461, 2007, pp. 288-295.

Saifullah, et al. "New Cooling Channel Design for Injection Moulding" World Congress on Engineering, 2009, vol. I, 4 pages.

Li, et al., "Optimal design of heating channels for rapid heating cycle injection mold based on response surface and genetic algorithm" Materials and Design 30, 2009, pp. 4317-4323.

Wimpenny, et al., "Rapid laminated tooling", Journal of Materials Processing Technology 138, 2003, pp. 214-218.

"Rapid Manufacturing, Part II: Pioneer Applications", Composites Technology, Aug. 2008 5 pages.

Jeng, et al., "Rapid mold temperature control in injection molding by using steam heating", International communications in Heat and Mass Transfer 37, 2010, pp. 1295-1304.

Chang, et al., "Rapid Mold Temperature Controlon Micro Injection Molded Partswith Highaspect Ratio Micro-Features", Society of Plastics Engineers, ANTEC 2006, pp. 1275-1279.

Chen, et al., "Rapid mold temperature variation for assisting the micro injection of high aspect ratio micro-feature parts using induction heating technology", Journal of Micromechanics and Microengineering, Jul. 26, 2006, pp. 1784-1791.

Yao, et al., "Rapid Thermal Cycling of Injection Molds: An Overview on Technical Approaches and Applications", Advances in Polymer Technology, vol. 27, No. 4, 2008, pp. 233-255.

Xu, et al., "Rapid Thermal Cycling with Low Thermal inertia Tools", Polymer Engineering and Science, 2009, 12 Pages.

Yao, et al., "Rapid Thermal Response Molding for Cycle Time Reduction", Society of Plastics Engineers, ANTEC 2003, pp. 607-611.

Wang, et al., "Research on a New Variotherm Injection Molding Technology and its Application on the Molding of a Large LCD Panel", Polymer-Plastics Technology and Engineering, 48, 2009, pp. 671-681.

Huang, et al., "The Development of High Frequency Induction Heating Embedded Coil", Impact, International Microsystems, Packaging, Assembly and Circuits Technology Conference, 2009, pp. 701-704.

Cardon, et al., "The effect of implementing hybrid mold temperature dependant heat characteristics on the accuracy of 3D injection molding simulation", Society of Plastics Engineers ANTEC 2007, pp. 2586-2590.

Chen, et al., "True 3d and Fully Transient mold Temperature Simulation for RHCM Process", Society of Plastics Engineers ANTEC 2006, pp. 1295-1298.

"Turning up the heat: mould temperature control: for too many processors, mould-temperature control is about little more than turning on the coldwater tap. Life is never that simple, and with increasing

(56) References Cited

OTHER PUBLICATIONS customer demands, not only for improved part performance, but also for top surface quality straight out of the mould, it is getting more complicated all the time. Enter vario-thermal mould-temperature control", Plastics Engineering, Oct. 1, 2008, 5 pages.

Chen, et al., "Variable Mold Temperature on the Part Qualities of Injection Molded Parts", Society of Plastics Engineers ANTEC 2005, 588-592.

Chen, et al., "Variable Mold Temperature to Improve Surface Quality of Microcellular Injection Molded Parts Using Induction Heating Technology", Advances in Polymer Technology, vol. 27, No. 4, 2008, pp. 224-232.

Kim, et al., "Shiny Solid Surface Structural Foam Injection-Molded Parts With Rapid Mold Temperature Control by MmSH Process (Momentary Mold Surface heating and Cooling Process)", Soonchunhyang University, Technical Session T52, 2002, 4 pages.

Yang, et al., "Simulation of Phase-Change Heat Transfer During Cooling Stage of Gas-Assisted Injection Molding of High-Density Polyethylene via Enthalpy 'Transformation Approach", Polymer Engineering and Science, 2009, 9 pages.

Wang, et al., "Research of thermal response simulation and mold structure optimization for rapid heat cycle molding processes, respectively, with steam heating and electric heating", Materials and Design 31, 2010, pp. 382-395.

* cited by examiner

INJECTION MOLDING APPARATUS AND METHOD

BACKGROUND

Injection molding is commonly performed in the making of plastic parts. Such molding typically uses two or more mold components that are brought together (e.g., on platens) to form a mold cavity. When possible, such mold components are maintained at a generally static temperature that efficiently cools the molten resin injected into the cavity so that the resin solidifies quickly. The molding of a complicated part may require an elevated cavity surface temperature during the injection phase to ensure optimal feature replication. To meet this need, one or both mold components are sometimes heated prior to injecting the molten resin into the cavity, which may necessitate that one or both mold components be cooled after injecting the resin, in order to adequately solidify the resin. Such a variothermal injection molding process may often have a lengthened cycle time because of the need to remove the thermal energy stored in the (heated) mold components, above and beyond removing thermal energy from the molten resin itself

SUMMARY

Disclosed herein in various aspects is a heatsink for use in injection molding, with at least one load-bearing path with a rearward segment, wherein at least a portion of at least one non-load-bearing, dynamic heat-transfer zone of the heatsink is laterally offset from the rearward segment of the load-bearing path.

These and other aspects of the invention will be apparent from the detailed description below. In no event, however, should the above summaries be construed as limitations on the claimable subject matter, whether such subject matter is presented in claims in the application as initially filed or in claims that are amended or otherwise presented in prosecution.

Figure 1:
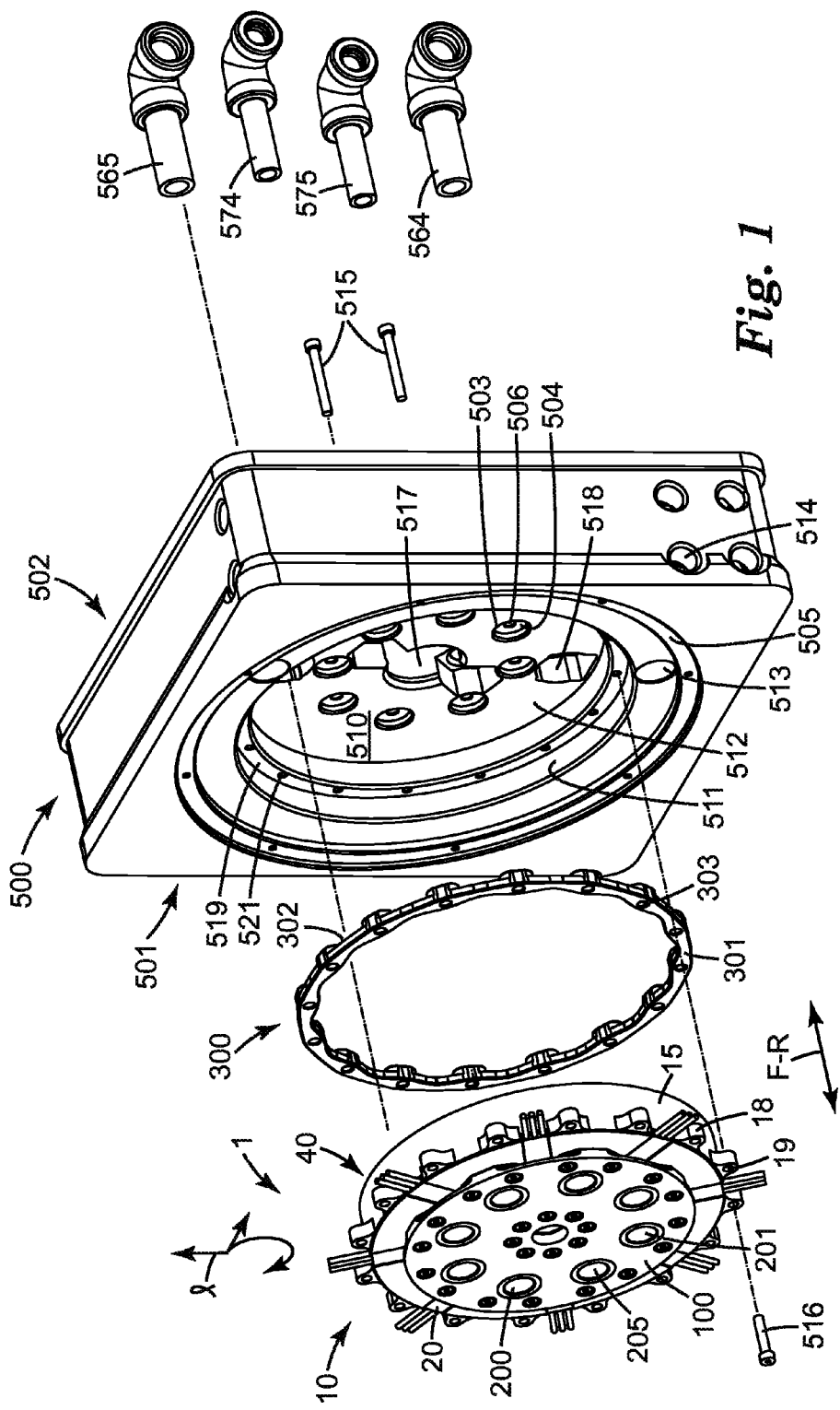
FIG. 1 is a front/side perspective partially exploded view of an exemplary heatsink as disclosed herein, along with a heatsink support and other components.

Like reference numbers in the various figures indicate like elements. Some elements may be present in identical or equivalent multiples; in such cases only one or more representative elements may be designated by a reference number but it will be understood that such reference numbers apply to all such identical elements. In particular, in some embodiments certain components may be present in interchangeable and/or identical multiples (e.g., pairs). For these components, the designation of "first" and "second" may apply to the order of use, as noted herein (with it being irrelevant as to which one of the components is selected to be used first). Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Terms such as same, equal, uniform, constant, and the like, as applied to a quantifiable property or attribute, mean within +/−5%, unless otherwise defined herein. As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties); the term "substantially" means to a high degree of approximation (e.g., within +/−10% for quantifiable properties) but again without requiring absolute precision or a perfect match.

DETAILED DESCRIPTION

Disclosed herein is a heatsink that may be useful e.g. in injection molding. By heatsink is meant a device that can be thermally coupled to (and in some embodiments, can provide) at least one molding surface of an injection molding system and that can be rapidly heated and/or cooled so as to transfer thermal energy into and out of at least one mold cavity that is partially defined by the molding surface to which the heatsink is coupled. An exemplary heatsink 1 is shown in front/side perspective view in FIG. 1 with frame 100 holding cavity inserts 200 on front side 10 of heatsink 1, and is shown in front/side perspective view in FIG. 2 with frame 100 and cavity inserts 200 exploded away therefrom. Exemplary heatsink 1 is further shown in rear/side perspective view in FIG. 3 with sealing plate 400 exploded away therefrom, and in rear plan view in FIG. 4 with sealing plate 400 omitted for clarity.

Heatsink 1 comprises front side 10 and rear side 40, and comprises a front-rear axis "F-R" as shown e.g. in FIGS. 1-5. As used herein, terms such as front, frontward, frontwardly, front-facing, frontmost, forward, forwardly, forwardmost, forward-facing, etc., denote a direction toward a mold cavity formed when the heatsink is brought together with a second platen to form such a mold cavity, as discussed in detail later herein. Such a direction is e.g. toward the left side of FIGS. 1-3 and 5. Terms such as rear, rearward, rearwardly, rearmost, rear-facing, etc. denote a direction away from such a mold cavity (e.g., toward the right side of FIGS. 1-3 and 5). Front-rear axis "F-R" thus denotes an axis passing through the heatsink in a generally front-rear direction, as shown e.g. in FIGS. 1-5.

Heatsink 1 further comprises lateral axes "l", which are broadly defined as including any axis (line) that extends through any portion of heatsink 1 along a direction that lies generally within the bounds of front side 10 and rear side 40 of heatsink 1. Such a lateral axis may e.g. extend radially outward from the lateral center of heatsink 1 (which in the exemplary embodiment of FIG. 2 is occupied by central through-hole 77) toward a lateral edge of heatsink 1 (which in the exemplary embodiment of FIG. 4 is provided by radially-outwardmost sidewall 15). Such a lateral axis does not necessarily have to pass through the lateral center of heatsink 1 (e.g., it may be a chord that laterally passes through a portion of heatsink 1 without passing through the lateral center thereof). Such a lateral axis may not necessarily have to be a straight line (that is, such a lateral axis might comprise an arcuate path, e.g. a circumferentially-extending path). Such a lateral axis may often be generally orthogonal to front-rear axis "F-R" of heatsink 1, but does not have to be strictly orthogonal to front-rear axis "F-R". Various exemplary lateral axes "l" are illustrated in FIGS. 1-4.

The terminology of lateral axes and directions is provided so that certain concepts that are introduced later (e.g., such as the concept of a feature being "laterally offset" from another feature, or "laterally surrounded" by other features) will be more easily appreciated. It will be understood that although in the exemplary embodiments depicted herein, heatsink 1 comprises a generally circular geometry, this does not have to be so. That is, heatsink 1, main body 16 thereof, external surfaces of heatsink 1, and/or components that are arranged upon heat sink 1, may be provided or arranged in any convenient geometry, including oval, rectangular, square, irregular, and so on. Thus, terms such as radial, radially-outward, and radially-inward, and terms such as annular, circumferentially, and the like, are used for convenience of description and do not necessitate a strictly circular geometry. However, in some specific embodiments heatsink 1, components thereof, and/or devices used therewith, may be provided in a generally, or substantially, circular format, as shown in exemplary illustration in the Figures.

As noted above, a heatsink can be heated and/or cooled so as to transfer thermal energy into and out of at least one mold cavity of an injection molding system. As disclosed herein, such a heatsink may be configured e.g. to comprise low thermal mass, and high thermal conductivity, and to be at least somewhat thermally isolated from other components of the injection molding system. Such properties may combine to significantly enhance the performance of injection molding, particularly in any circumstance in which molten resin may flow in proximity to (e.g., between) generally oppositely-facing mold cavity surfaces that, at any location, are closer to each other than about 500 microns. (In this context, generally oppositely-facing is not limited to mold surfaces that are planar and/or strictly parallel to each other; for example, such surfaces may be at an angle, e.g. any angle less than 90 degrees, from each other.) For convenience of description, such circumstances will be collectively referred to herein as "microflow" molding. As will be described later in detail, such microflow molding may occur in several instances. It is noted that in microflow molding, the generally oppositely-facing mold cavity surfaces do not necessarily have to be supplied by different mold components (e.g., from a component of an so-called A side of an injection-molding press and a component of a so-called B side); rather, they may often be supplied by surfaces of a single mold component as described later herein.

Microflow molding as performed in the art has been often found to require deviation from desirable injection molding practices. Conventionally, in molding it is desired to maintain one or both mold components at a (generally constant) temperature that is the lowest possible temperature compatible with achieving satisfactory filling of the mold cavity(s) therein, so that the injected molten resin may be cooled and solidified as quickly as possible. In microflow molding in the art, it has been often found necessary to maintain one or both mold components at a high temperature prior to and during injection of the molten resin. This is because with the molten resin passing near (e.g., between) mold cavity surfaces that are so close together, solidified skins that may form in the molten resin as a result of proximity to each (cool) mold cavity surface, may approach each other and impede flow of the molten resin. Given this necessity to heat one or both of the mold components in order to achieve satisfactory mold-filling, it may then be necessary to cool one or both mold components so that the molded part can be fully solidified and demolded. Thus, microflow molding may involve the heating and cooling of relatively large mold components that have high thermal mass, thus resulting in long molding cycle times.

Figure 2:
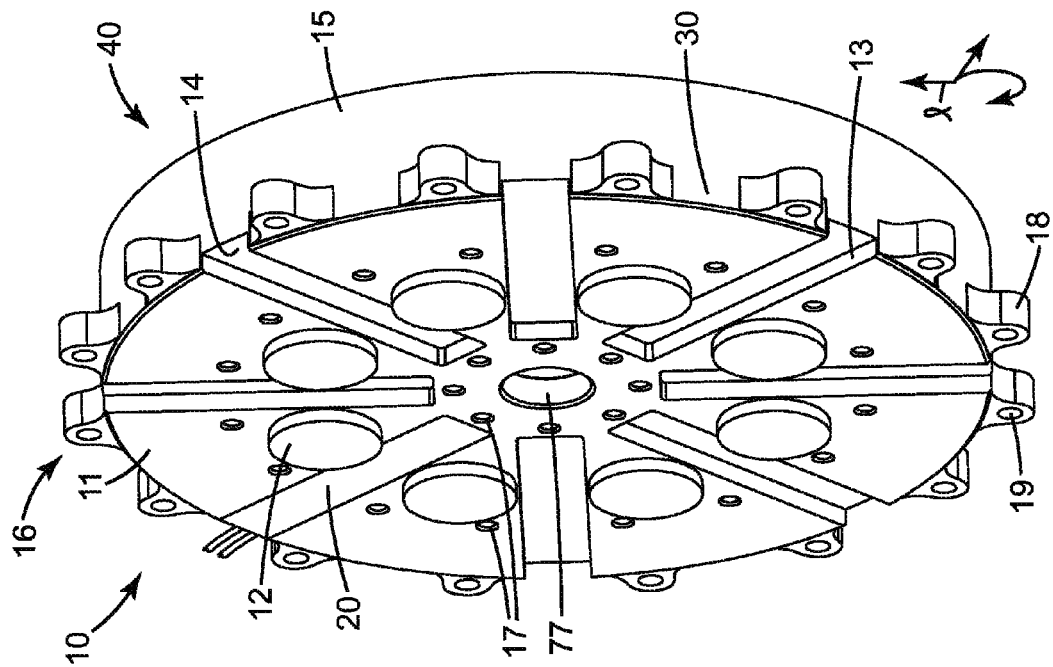
FIG. 2 is a front/side perspective exploded view of an exemplary heatsink as disclosed herein.
Figure 2:
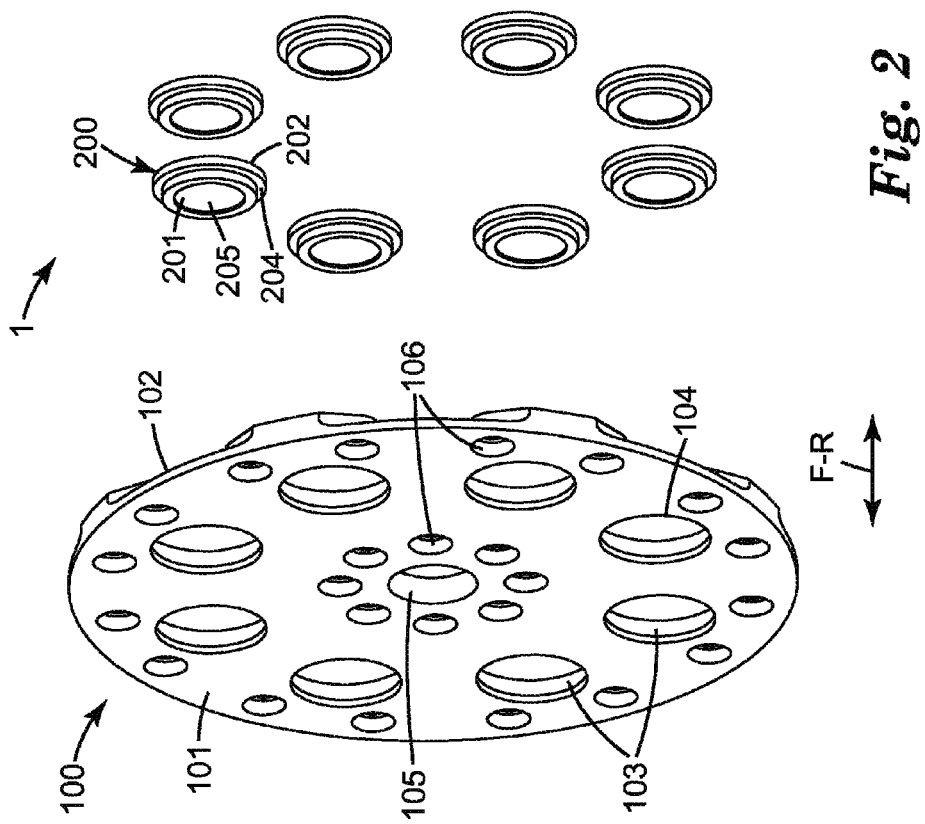

The use of a heatsink as disclosed herein can mitigate such disadvantages, e.g. by providing the heatsink as a low thermal mass, high thermal conductivity apparatus that can be at least somewhat thermally isolated from other components of an injection molding system (e.g., from a heatsink support 500 as shown in FIG. 1, as well as from a mold base and/or platen on which the heatsink support may be located). This may provide that essentially only the heatsink (and, of course, at least one molding surface provided by the heatsink) need be heated and cooled over the full temperature range needed to ensure acceptable molding. Such a process may be performed much more rapidly than the heating and cooling over such a wide temperature range, of conventional injection molding cavities as may be provided by conventional metal mold components that may weight e.g. tens of kilograms.

In further embodiments, microflow molding as disclosed herein may involve generally oppositely-facing mold cavity surfaces that, at any location, are closer to each other than about 250, 100, 50, or 25 microns.

Because high pressures (e.g., as much as 200 megaPascals or more) may also be involved in e.g. microflow molding, a heatsink as disclosed herein comprises one or more load-bearing paths. Such a load-bearing path of the heatsink may be configured to intersect a mold cavity that is formed when the heatsink is used in an injection-molding system. By "intersect" is meant that the load-bearing path, when extended forward from the heatsink, passes through at least portions of surfaces of the heatsink that help define the mold cavity (whether such surfaces are e.g. surfaces of a main body of the heatsink, or of a component such as a cavity insert as described later herein that is positioned on the front side of the main body of the heatsink). The providing of such a load-bearing path can allow the heatsink to be used to transmit high forces into the local area of the mold cavity (e.g., so that molten resin may be injected into the cavity at high pressure without the resin leaking therefrom), while minimizing the exposure of other components of the heatsink (e.g., dynamic heat-transfer structures that might be fragile) to such high forces. In various embodiments, a load-bearing path or paths may extend generally parallel to the front-rear axis of the heatsink (meaning within about 30 degrees of strictly parallel to the front-rear axis of the heatsink). In specific embodiments, a load-bearing path or paths may be oriented strictly parallel to the front-rear axis of the heatsink (as illustrated by exemplary load-bearing path "L-B" of FIG. 5, which path is oriented strictly parallel to front-rear axis "F-R"). As disclosed herein, such a load-bearing path or paths can be provided in such manner as to largely preserve or enhance the thermal isolation of the heatsink.

To enable the use of relatively high injection pressures as mentioned above, a load-bearing path may be designed to minimize the relative motion of the mold cavity surfaces that are on generally opposing faces of the cavity (i.e., mold cavity surfaces provided by the heatsink, and those provided by a "B" side mold component as described later herein). One skilled in the art will appreciate that the contacting surfaces of the mold components that form the parting line may be "preloaded" during the process of clamping the mold components together so that the pressure under which molten resin is subsequently injected does not exceed the preload (which might cause a gap to form between the contacting surfaces and thus possibly result in unacceptable flashing of molten resin into the gap). To achieve this, a load path should be able to survive a compressive (pre)-load that is greater than the projected area of the molding cavity multiplied by the peak injection pressure. It may be desired to use a heatsink as described herein in injection molding operations involving a peak resin injection pressure (measured in the molding cavity) of e.g. 20000 psi or more (and thus involving a preload commensurate for use with such injection pressures). Thus, in various embodiments a heatsink as described herein may be configured to comprise one or more load paths that can withstand an injection pressure (measured in the molding cavity supported by that load path) of at least 15000, 20000, 25000, or 30000 psi. It will be appreciated that the designs presented herein, in which (e.g., relatively fragile) dynamic heat-transfer structures of the heatsink may be substantially isolated from the load path(s), can allow this to be achieved.

It should be appreciated that not all portions of a heatsink that contact molten resin may necessarily be intersected by a load-bearing path. For example, if e.g., runners and the like are provided in the heatsink, the area of the heatsink comprising the runners may not necessarily be supported by a load-bearing path. However, if desired in some embodiments a secondary load-bearing path may be provided for e g runners, as discussed later herein.

In further detail, heatsink 1 may comprise a main body 16 with a base portion 30 which may be laterally continuous and may be e.g. from about 1 to about 15 mm in thickness. Main body 16 may comprise a forward-facing surface that provides at least some portion of front major surface 11 of front side 10 of heatsink 1 (as shown e.g. in FIG. 2). Heatsink 1 may comprise a laterally-outwardmost sidewall, e.g. as provided by radially-outwardmost sidewall 15 of main body 16 of heatsink 1, as depicted in FIG. 2. In some embodiments, heatsink 1 and main body 16 thereof may comprise a maximum lateral dimension that is greater (e.g., by a factor of 2, 4, or 8) than the maximum front-rear dimension of heatsink 1 and main body 16 thereof.

Front side 10 of heatsink 1 may comprise at least one (e.g. a plurality of) load-bearing region(s), which in some embodiments may conveniently take the form of forwardly-protruding bosses 12 as shown in FIG. 2. In various embodiments such bosses may protrude forwardly at least 0.1, 0.2, 0.4, or 1.0 mm. In further embodiments, such bosses may protrude forwardly at most 10, 5, 2, or 1.0 mm. Such bosses may have any convenient lateral shape (with circular shapes being depicted in the exemplary embodiment of FIG. 2). In some embodiments, main body 16, including e.g. base 30, outward sidewall 15, and bosses 12 (as well as various dynamic heat-transfer fins that are described later) may be an integral main body, meaning that main body and the above-listed components are made of the same piece of material rather than comprising separately-made components that are then attached to each other. In some embodiments, other components that may be used with main body 16 of heatsink 1 (and that for convenience may be referred to herein as being components of heatsink 1 as assembled), such as cavity inserts, load-bearing members, a frame, screws, etc. may not necessarily be integral with main body 16 but rather may be separately made components that may e.g. be attached to main body 16 directly or indirectly.

Front side 10 of heatsink 1 may comprise at least one molding surface 205, and in some embodiments may comprise a plurality of discrete molding surfaces (eight such surfaces 205 are illustrated in the exemplary embodiment of FIGS. 1 and 2. By discrete molding surfaces are meant molding surfaces that are physically separated from each other so that they do not mold surfaces of the same finished part. Such surfaces may conveniently be provided e.g. on forward-facing locations of bosses 12. In some embodiments, such molding surfaces may be provided by one or more cavity inserts 200 (as shown e.g. in FIGS. 1 and 2) that may be placed on the front of bosses 12. Cavity inserts may be held in place by frame 100, as shown in exemplary embodiment in FIGS. 1 and 2.

It will be appreciated that an above-described boss is merely one convenient way in which a cavity insert can be placed into a load-bearing path of the heatsink. Such a boss or bosses are not necessarily required; thus in some embodiments they may be absent, and/or may be replaced by some other structure (e.g., a shallow cavity in the forward face of the heatsink main body, into which the cavity insert may be placed).

Heatsink 1 comprises at least one load-bearing path, which may be used to locally transmit force onto a mold cavity of an injection molding system. With reference to the illustrative example shown in front/side view in FIG. 2, such a load-bearing path may comprise a frontward segment that passes through cavity insert 200 of heatsink 1, passes rearward through boss 12 of main body 16 of heatsink 1, and passes further rearward through an area of base 30 of main body 16 of heatsink 1 that underlies boss 12 along the front-rear axis of heatsink 1. Turning to the exploded rear/side view of FIG. 3, such a load-bearing path (as it continues rearward from the area of base 30 of main body 16 that underlies boss 12) may comprise a rearward segment that may be provided e.g. by a load-bearing member 90 that is provided on rear side 40 of heatsink 1. In some embodiments a load-bearing member 90 may be integral with main body 16 of heatsink 1. However, in other embodiments a load-bearing member 90 may be a separately made member that is attachable to heatsink 1 (e.g., to the rear side of main body 16 of heatsink 1). As will be evident, using a separately-made, attachable member 90 allows member 90 to be made of a different material than main body 16, which may provide significant advantages in at least some embodiments.

Figure 3:
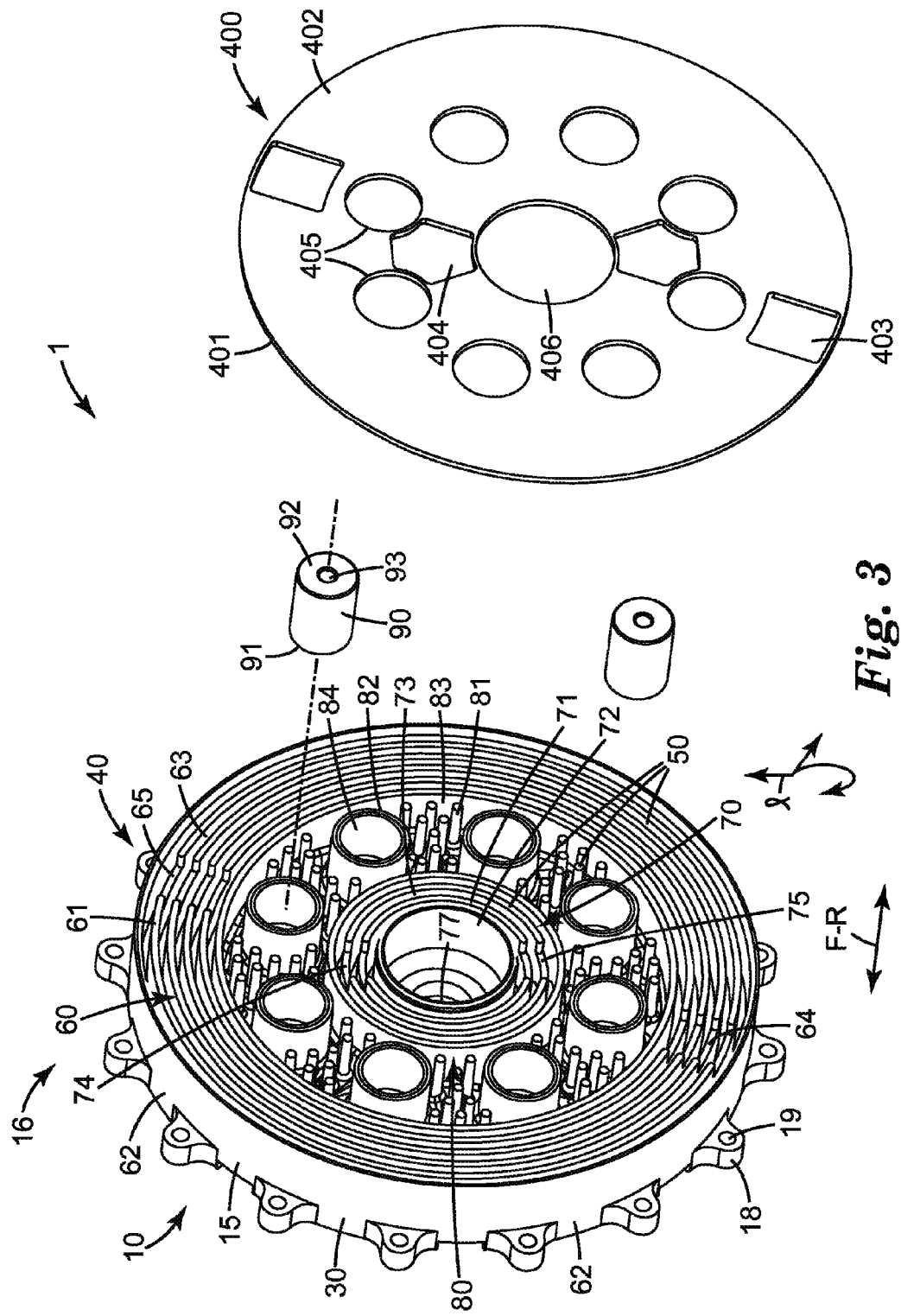
FIG. 3 is a rear/side perspective exploded view of an exemplary heatsink as disclosed herein.
Figure 4:
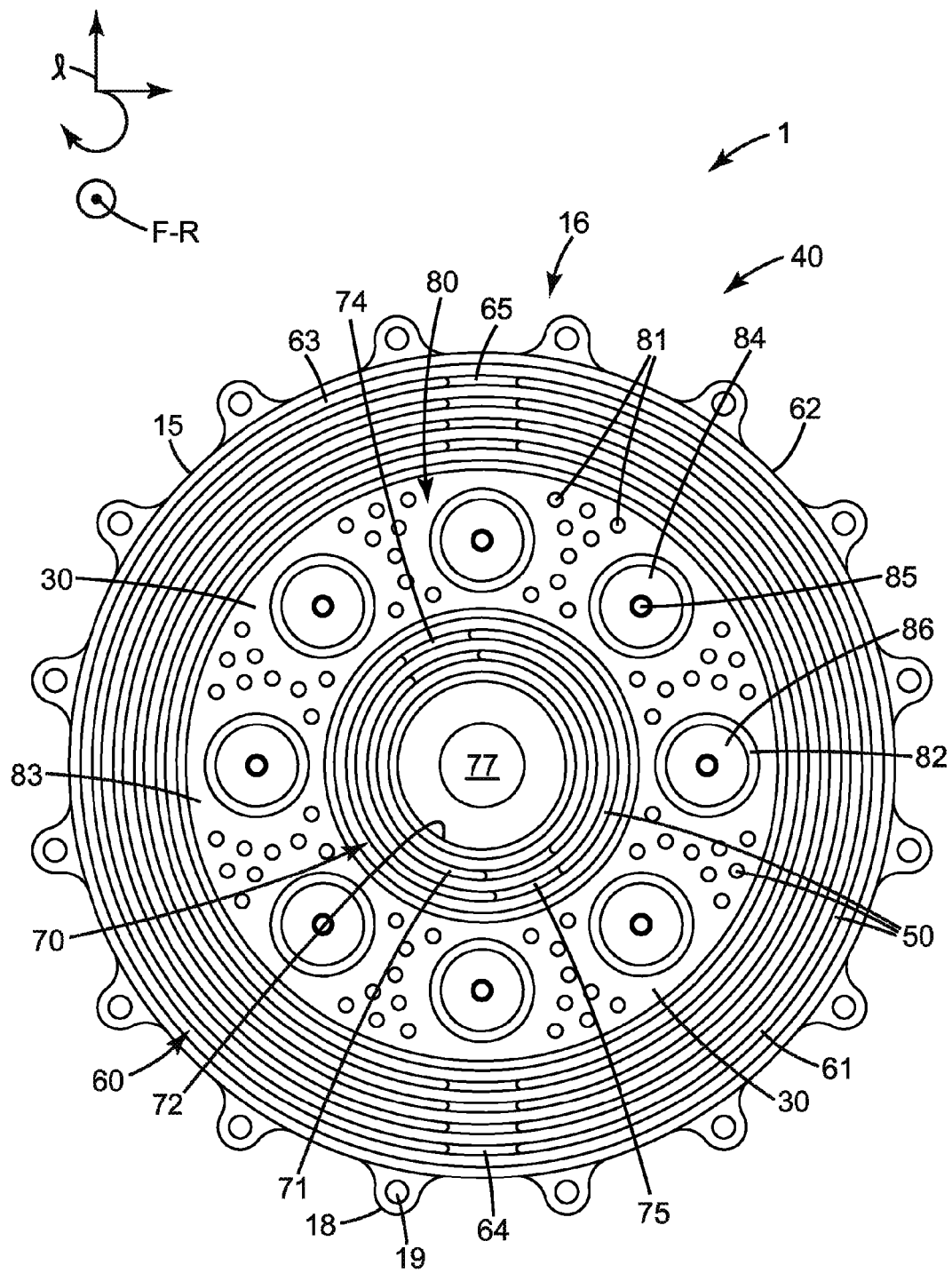
FIG. 4 is a rear plan view of the heatsink of FIG. 3.

Heatsink 1, e.g. the rearward side of main body 16 of heatsink 1, comprises at least one dynamic heat transfer zone, as exemplified by zone 50 depicted in FIGS. 3 and 4. By dynamic heat-transfer zone is meant that zone 50 comprises a plurality of dynamic heat-transfer fins that are configured to exchange thermal energy with a dynamic (moving) heat-transfer fluid. Such a fluid may be gaseous (e.g., air, nitrogen, steam, etc.) or liquid (e.g., water, oil, etc.). The term dynamic heat-transfer fin is broadly defined herein as meaning any structure that protrudes (e.g., generally rearwardly) from base 30 of heatsink 1 and that has a high (meaning, in the context of a heat transfer fin, at least 2:1) aspect ratio of fin height (meaning the average distance that the fin protrudes rearwardly from base 30) to fin width (meaning the average distance across the fin along its shortest axis, which shortest distance will often be along an axis that is generally orthogonal to the height axis). In various embodiments, the aspect ratio of such fins may be at least 3:1 or 5:1. Various exemplary fins of heatsink 1 will be discussed in further detail later herein.

Dynamic heat-transfer fins are by definition non-load-bearing, by which is meant that when two platens of an injection molding system comprising the herein-disclosed heatsink are brought together under pressure, less than 5% of the total force that passes through the heatsink passes through the dynamic heat-transfer fins, individually or collectively. Thus, in some embodiments essentially all (e.g., greater than 95%) of the force that passes through heatsink 1 is transmitted through the above-described load-bearing path or paths (e.g., as provided by load-bearing member or members 90). It should be noted that in some cases, in addition to the load(s) imparted to the mold cavity(s), a load may be imparted at one or more other locations. For example, a secondary load may be provided along a separate, independent load-bearing path that does not intersect a molding cavity, e.g. for the purpose of minimizing flashing from runners as mentioned earlier herein. Any such secondary load-bearing path(s) will likewise not result in more than 5% of the total force that passes through heatsink 1 being passed through any of the dynamic heat-transfer fins.

In exemplary embodiments of the general type depicted in FIG. 3, at least a portion of a dynamic heat-transfer zone of heatsink 1 may be laterally offset from a rearward segment of at least one load-bearing path that intersects a mold cavity of the heatsink. In the exemplary design of FIG. 3, it is evident that at least dynamic heat transfer regions 60 and 70 of dynamic heat-transfer zone 50 (which regions 60 and 70 are described in detail later herein), are laterally offset from the rearward segments of load-bearing paths provided by load-bearing members 90. In further embodiments, all portions of a dynamic heat-transfer zone may be laterally offset from a rearward segment of such a load-bearing path.

In particular embodiments of the type depicted in FIG. 3, at least the rearward segment of a load-bearing path may not be in direct contact with any other load-bearing member of a separate load-bearing path. Rather, in such embodiments the rearward segment of the load-bearing path may be laterally surrounded by portions of non-load-bearing, dynamic heat-transfer zone 50 of rear side 40 of heatsink 1. By laterally surrounded is meant that the segment is surrounded on all lateral sides (e.g., radially inwards from, radially outwards from, and in both circumferential directions from) by non-load-bearing, dynamic heat-transfer zone 50. In the exemplary design of FIG. 3, it is evident that the rearward segments of load-bearing paths provided by load-bearing members 90 are all laterally surrounded by non-load-bearing, dynamic heat-transfer zone 50.

In some embodiments, multiple load-bearing paths may provided. It will be recognized that a frontward segment of any such load-bearing path as described above may often be provided by an area of base 30 of main body 16 (e.g., an area of base 30 that is located directly rearwardly from a particular molding surface/cavity). As depicted e.g. in FIG. 2, in some embodiments base 30 may be laterally continuous. Thus, in such designs, if multiple load-bearing paths are present, a frontward segment of a load-bearing path that is provided by an area of laterally-continuous base 30 may not necessarily be discrete from frontward segments of other load-bearing paths provided by other areas of base 30. Such non-discrete segments of load-bearing paths as may be provided by the above-described load-bearing areas of base 30 may be contrasted with discrete load-bearing path segments as may be provided as disclosed herein. For example, in the exemplary embodiment shown in FIG. 3, multiple load-bearing members 90 are provided that are attached to main body 16 of heatsink 1 and that extend rearwardly therefrom. (In FIG. 3, only two of eight such members 90 are actually depicted, with six being omitted for clarity.) Each load-bearing member 90 provides a rearward segment of a load-bearing path; and, in some embodiments each such rearward segment may not be laterally connected to any rearward segment of a neighboring load-bearing path. Rather, each such rearward segment may be separated from a rearward segment of a neighboring load-bearing path by a portion of non-load-bearing dynamic heat-transfer zone 50, as is the case in the exemplary embodiment of FIG. 3. Such separated load-bearing path segments are termed "discrete" load-bearing path segments. It is noted that the term discrete is used to mean that each rearward segment is not directly connected to a rearward segment of a neighboring load-bearing path; the term is not meant to imply that the rearward segment is not directly connected to a segment, e.g. a frontward segment, of its own load-bearing path.

Any suitable number of load-bearing paths with discrete rearward segments may be used (e.g., 2, 3, 4, 5, 6, 8 or more). Such load-bearing paths with discrete rearward segments may be provided e.g. by a plurality of load-bearing members 90 (the term "member" is broadly defined and does not require any particular shape) that are each attached to, or integral with, main body 16 of heatsink 1. An attachable load-bearing member 90 may be directly or indirectly attached to main body 16 of heatsink 1 in any suitable manner. In embodiments of the general type depicted in FIGS. 1 and 3, load-bearing members 90 may be press-fitted (e.g., with an interference fit) into receptacles 84 defined by sleeves 82 of heatsink main body 16. As will be discussed later, mechanical fasteners such as e.g. screws may be used to perform or augment such attachment. In summary, any convenient method of attachment may be used, however (including e.g. adhesives, welding, interference fitting, mechanical fastening via e.g. one or more screws, clips, clamps, bands, and so on).

It will be appreciated that it may be advantageous for load-bearing member 90 to have a high compressive strength (a measure of the total load that the member can withstand before failing) and/or a high modulus (a measure of the resistance to deformation (strain) that the member will exhibit in response to a given stress). Preferred materials may possess high compressive strength and high modulus. It will also be appreciated that at least some portion of a load-bearing member 90 may be in direct contact with a surface of main body 16 of heatsink 1 (e.g., forward-facing surface 91 of load-bearing member 90 may be in direct contact with rear-facing surface 86 of main body 16 of heatsink 1). It will still further be appreciated that another portion (e.g., rear-facing surface 92 of load-bearing member 90) may be in contact with one or more other components of an injection-molding system (e.g., a heatsink support 500 as discussed later herein). Thus, a load-bearing member 90 represents a potential thermal leakage pathway which might undesirably reduce the thermal isolation of heatsink 1. Thus (in addition to the aforementioned high compressive strength and/or high modulus), it may be useful that load-bearing member 90 be comprised of a material that has a low thermal conductivity, e.g. in comparison to the material of which main body 16 of heatsink 1 is made. In various embodiments, a load-bearing member that is attachable to main body 16 of heatsink 1 is made of a material that exhibits a thermal conductivity that is less than the thermal conductivity of the material of which main body 16 of heatsink 1 is made, by a factor of at least 30%, 40%, 50%, or 70%. Given the above factors, in various embodiments load-bearing members 90 may be chosen from e.g. ceramic materials, low-thermal conductivity metals such as titanium, and the like (while main body 16 of heatsink 1 might be made of e.g. copper or copper alloy, and might e.g. comprise a thermal conductivity of at least 100, 200, 250 or more watts per meter per degree C.).

In various embodiments, an attachable load-bearing member 90 may comprise a length along its load-bearing axis (which axis may be generally aligned with the front-rear axis of heatsink 1 when the insert plug is attached to heatsink 1) that is at least about 2, 4, 8, or 12 mm. In further embodiments, a load-bearing member 90 may comprise such a length that is at most about 60, 30, or 10 mm. In particular embodiments, a load-bearing member 90 may comprise a cylinder (e.g., as shown in FIG. 3). A load-bearing member 90 may be solid; or, it may comprise a through-hole extending therethrough (e.g., along the load-bearing axis and/or the front/rear axis thereof) to accommodate the shaft of a screw that may be used to attach member 90 to main body 16 of heatsink 1, as mentioned above. If present, such a through-hole should not unacceptably detract from the compressive strength of load-bearing member 90.

Figure 5:
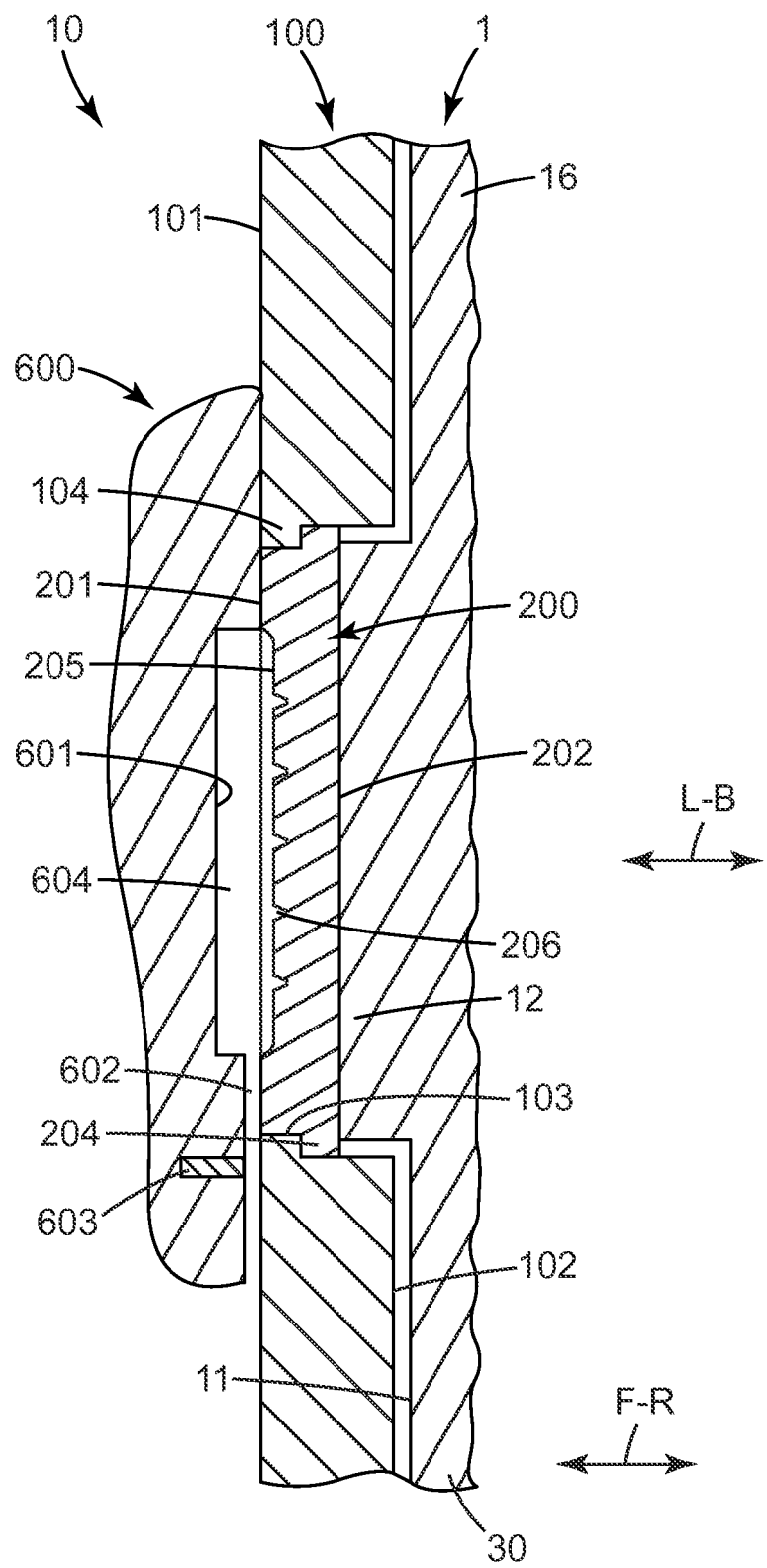
FIG. 5 is a side schematic cross-sectional view of a heatsink front side with a cavity insert located thereon.

In some embodiments, a projected area of a rearward segment of a load-bearing path may be (and in some embodiments, may overlap) at least 60% of the area of a molding surface (provided by the heatsink) that the load-bearing path intersects. Such a projected area may be obtained by selecting, anywhere along a load-bearing member that provides the rearward segment of the load-bearing path, a cross-sectional load-bearing area of the load-bearing member (such an area may be generated by taking a slice through the load-bearing member along a plane generally normal to the load-bearing path). In some embodiments, the projected area may be taken from a location along the front-rear length of the load-bearing member, that has a minimum cross sectional area in comparison to other locations along the front-rear length of the load-bearing member. The selected area may then be projected forward for comparison to the projected area of the molding surface of the heatsink that is supported by that particular load-bearing path, in order to determine the ratio of the two areas, and/or the amount of overlap. As a convenient point of reference for comparison, the projected area of the load-bearing member, and the projected area of the molding surface of the heatsink, may be projected (forward) to the parting line between the molding-surface bearing component of the heatsink, and a component (e.g., a B-side mold component as described later herein) that mates with the heatsink mold component in forming the mold cavity. By way of specific example, such a projected area of a rearward segment of a load-bearing path might be e.g. the area of rear face 92 of a titanium plug 90 (as shown in FIG. 3), projected forward along the load-bearing path (the rearward portion of which path is defined by the plug 90). Such a projected area of a molding surface might be e.g. the area of surface 205 of cavity insert 200 (as shown in FIGS. 1, 2 and 5). Both areas can be projected forward to the parting line between cavity insert 200 and mold component 600, as shown in FIG. 5, for comparison.

In further embodiments, such a projected area of the load-bearing path may be (and, in some embodiments, may overlap) at least 80%, 90%, 95%, or 100%, of the projected area of the intersected molding surface. In particular embodiments, such a projected area of a load-bearing path may completely circumscribe the molding surface with which the load-bearing path intersects (for example, in a case in which the area of e.g. a titanium plug is greater than the projected area of the molding surface that it supports). In such embodiments, the projected area of the rearward segment of the load-bearing path may be at least e.g. 100%, 110%, 120%, or 140%, of the projected area of the molding surface with which the load-bearing path intersects. (In a case in which the load-bearing member comprises a void space (e.g., comprises a through-hole for accommodating a screw shaft, as in exemplary load-bearing members 90 as shown in FIG. 3), this can be accounted for in the calculation of the projected area of the load-bearing member.)

Heatsink 1 may be supported from the rear (that is, the direction away from the molding surfaces of heatsink 1) by heatsink support 500, as shown in exemplary embodiment in FIG. 1. Heatsink 1 may be attached to heatsink support 500 in any suitable way as long as such attachment does not unacceptably compromise the thermal isolation of heatsink 1.

In embodiments of the general type shown in FIGS. 1, 3, and 4, such attachment may be performed by screws 515. Screws 515 each comprise a shaft that passes through a front-rear through-hole 506 that is provided in heatsink support 500, with screw 515 comprising an enlarged head that is too large to pass through through-hole 506 and is thus configured to reside on the rear side 502 of heatsink support 500. The shaft of each screw 515 passes forwardly through through-hole 93 of load-bearing member 90 and a threaded forward end of the screw is threadably engaged into a threaded dead-end hole 85 in rear-facing surface 86 of receptacle 84 defined by sleeve 82 of heatsink main body 16. Tightening of screws 515 thus results in load-bearing members 90 being drawn against a rear surface of rear side 40 of heatsink 1 (specifically, forward-facing surfaces 91 of load-bearing members 90 are drawn against rear-facing surfaces 86 of heatsink 1 within receptacles 84 of heatsink 1 so as to provide a load-bearing interface therebetween). Such tightening also draws rearward surfaces 92 of load-bearing members 90 against forward-facing surfaces 504 of heatsink support 500. Thus in this exemplary manner, heatsink 1 may be attached to heatsink support 500 so that it may be supported thereby. It will be appreciated that such attachment may not necessarily affect the ability of the heatsink to survive compressive forces applied thereto in the process of closing the platens of an injection-molding system with which the heatsink is used. However, such attachment may ensure that heatsink 1 remains satisfactorily in place on a mold base of a platen of an injection molding system when the platens of the molding system are moved away from each other to open the mold.

It will be appreciated that in the above embodiment, the points of attachment of heatsink 1 to heatsink support 500 reside within the load-bearing paths as disclosed above. Although mechanical attachment (e.g., screws) were exemplified above, it will be appreciated that any suitable method of attachment may be used (e.g., adhesives, welding, and so on). In some embodiments, attachment of heatsink 1 to heatsink support 500 in which the points of attachment reside within the load-bearing paths as disclosed above may be the only way in which heatsink 1 is attached to heatsink support 500. In other embodiments, one or more additional attachments may be provided, e.g. to enhance the stability with which heatsink 1 is attached to heatsink support 500. For example, in the exemplary embodiment of FIG. 1, a radially-outermost perimeter of heatsink 1 is attached to annular ledge 519 of heatsink support 500. In the illustrated embodiment, heatsink 1 comprises radially-outwardly-extending protrusions 18 that comprise through-openings 19 through which screws 516 may extend and may be threadably attached to threaded holes 521 in annular ledge 519 of heatsink support 500. In the illustrated embodiment, annular spacer 300 is provided between rear-facing surfaces of protrusions 18 of heatsink 1, and annular ledge 519 of heatsink support 500, e.g. such that front face 301 of spacer 300 resides against heatsink 1, and rear face 302 of spacer 300 resides against ledge 519 of heatsink support 500. Such arrangements may provide enhanced thermal isolation of heatsink 1 from heatsink support 500. Spacer 300 may be made of any suitable material, e.g. a material that comprises a relatively low thermal conductivity (compared e.g. to copper or the like of which main body 16 of heatsink 1 may be made). In some embodiments, spacer 300 may be made of steel. Regardless of the material of which it is made, spacer 300 may provide at least some beneficial thermal isolation of heatsink 1 from heatsink support 500, if only by way of providing two interfaces across which thermal energy would have to be conducted, versus only a single interface being present were heatsink 1 to be directly contacted with heatsink support 500. Spacer 300 may comprise through-holes 303 by which spacer 300 can be secured in place with above-described screws 516;

or spacer 300 may be sandwiched between heatsink 1 and heatsink support 500 in any suitable manner (e.g., it may be held in place partially, or completely, by pressure applied by heatsink 1 and support 500).

In some embodiments, some or all points of attachment of heatsink 1 to heatsink support 500 may be located laterally away from (e.g., radially-inwardly away from, radially-outwardly away from, and/or circumferentially away from) load-bearing paths of heatsink 1, such that no load-bearing path of heatsink 1 passes through a point of attachment. (That is, in such embodiments, rear-facing surfaces 92 of load-bearing members 90 may be in contact with forward-facing surfaces of heatsink support 500, without members 90 necessarily being attached to heatsink support 500.)

Heatsink support 500 may comprise other features to accommodate heatsink 1 and to promote the efficient functioning thereof. In the specific embodiment illustrated in FIG. 1, heatsink support 500 comprises open-ended, forward-facing receptacles 503 that are configured to accept rearmost portions of load-bearing members 90 (and within which may be provided forward-facing surfaces 504 against which rear-facing surfaces 92 of load-bearing members 90 may be abutted as described above). Such receptacles 503 may enhance the stability with which load-bearing members 90 are held in place. Also as shown in FIG. 1, front side 501 of heatsink support 500 may comprise an open-ended, forward-facing cavity 510 that is configured to accept main body 16 of heatsink 1. Cavity 510 may be shaped and sized e.g. so that radially-inward-facing surface 511 of heatsink support 500 circumferentially surrounds laterally-outwardmost sidewall 15 of heatsink 1. In some embodiments, surface 511 and the outward surface of sidewall 15 may closely abut each other (e.g., to within 4, 2, 1, or even 0.5 mm); however, in order to enhance the thermal isolation of heatsink 1 it may be desired that little or no portions of the surfaces actually contact each other. Heatsink support 500 may comprise one or more through-holes through which fittings to supply dynamic heating or cooling fluid to heatsink 1 may be inserted (as exemplified by through-hole 518 through which fitting 564 may be inserted). Heatsink support 500 may also comprise one or more through-holes (e.g., 513) through which e.g. electrical wires used to power one or more optional static heating and/or cooling elements may be passed. Still further, heatsink support 500 may comprise one or more through holes (as exemplified by laterally-centered orifice 517) through which an injection-molding nozzle may be inserted. Still further, heatsink support 500 may comprise one or more inlets and outlets (e.g., 514) by way of which a heating or cooling fluid may be circulated into a hollow interior space, into channels, etc., of heatsink support 500, so that the temperature of heatsink support 500 may be controlled if desired. Heatsink support 500 may be made of any suitable material with sufficient mechanical strength to support heatsink 1 during injection molding operations. For example, a metal, such as copper or copper alloy, may be used.

Front side 10 of heatsink 1 comprises at least one molding surface 205 that defines at least a portion of a mold cavity when heatsink 1 is used in an injection molding system as disclosed herein. In some embodiments, front side 10 of heatsink 1 may comprise a plurality of discrete molding surfaces 205, each of which intersects a separate load-bearing path of a plurality of load-bearing paths of heatsink 1. In some embodiments, each discrete molding surface 205 may be individually provided on a forward-facing location of one of a plurality of discrete bosses 12 that protrude forwardly from front side 10 of main body 16 of heatsink 1.

In some embodiments, each such discrete molding surface may be provided by a cavity insert 200 (as shown e.g. in FIGS. 1, 2 and 5) that may be individually positioned on a front surface of a forwardly-protruding boss 12. Each cavity insert 200 may comprise a front surface 201 that provides a molding surface 205, and a rear surface 202 that may be directly contacted with a front surface of main body 16 of heatsink 1 (e.g., with a front surface of a boss 12). In this manner intimate thermal contact may be established between cavity insert 200 and main body 16 of heatsink 1 so as to thermally couple them together. When heatsink main body 16 with cavity inserts 200 thereon is brought together with a second mold component 600, molding surfaces 205 of each cavity insert 200 may combine with surface portions (e.g. surface 601) of second mold component 600 to provide molding cavities 604, as shown in FIG. 5 and as discussed in further detail later herein.

A cavity insert 200 should comprise sufficient thermal conductivity to allow thermal energy to be satisfactorily transmitted (e.g. from heatsink main body 16) through the cavity insert to the molding surface thereof. However, it has been found that it may not be necessarily required that cavity insert 200 be made of a material that has a thermal conductivity as high as that of main body 16 of heatsink 1. That is, the path length over which thermal energy may need to be conducted through the body of cavity insert 200 to reach molding surface 205 thereof (as exemplified by the distance from rear surface 202 of cavity insert 200 to front, molding surface 205 as pictured in FIG. 5) may be very short, e.g. only a half millimeter or less. With such a short path length, it may not be paramount that the thermal conductivity of cavity insert 200 be as high as e.g. that of main body 16 of heatsink 1. And, it may be advantageous that cavity insert 200 be made of a very hard and strong material in order to survive the very high forces applied thereto in the process of injection molding. Thus, if main body 16 of heatsink 1 is e.g. copper or copper alloy (with a thermal conductivity in the range of e.g. 260 watts per meter per degree C.), cavity insert 200 may be made of a material that is very hard and strong, and that has a lower thermal conductivity than copper. Such a material might include e.g. tool steel, nickel, or even a ceramic material.

One or more cavity inserts 200 may be held in place (e.g., on bosses 12) by frame 100 that may be positioned forward of front side 11 of main body 16 of heatsink 1 and may be attached to main body 16 of heatsink 1 to hold each cavity insert in position, as shown in exemplary embodiment in FIGS. 1, 2 and 5. For example, frame 100 may comprise through-openings 103 that are configured to receive cavity inserts 200, each of which through-opening 103 may have a flange 104 that is configured to overlap and abut lip 204 of cavity insert 200, as seen most clearly e.g. in FIGS. 2 and 5. Frame 100 may be attachable to heatsink 1, e.g. by screws (shown in FIG. 1, but not numbered) that pass through screw-holes 106 of frame 100 and that attach to threaded receptacles 17 (shown in FIG. 2) of main body 16 of heatsink 1. (In the view of FIG. 1, the screws are in place, with frame 100 thus being attached to heatsink 1; in the view of FIG. 2, frame 100 is exploded away from heatsink 1 and the screws are omitted for clarity.)

Frame 100 may comprise a forward-facing surface 101, and a rearward-facing surface 102, and may comprise at least one through-hole 105 (which may, when frame 100 is mated to heatsink 1, be aligned with through-hole 77 of heatsink 1 and/or through-hole 517 of heatsink support 500, e.g. so that an injection-molding-resin delivery nozzle may be inserted thereinto. Frame 100 may be abutted directly against at least some portions of major surface 11 of main body 16 of heatsink 1; or, in at least some areas of frame 100 a gap (e.g., an air gap) may be present between surfaces of frame 100 and surfaces of main body 16. That is, in embodiments of the latter type, frame 100 may contact surfaces of cavity inserts 200 (and optionally, a static heating and/or cooling element 20) without significantly contacting main body 16 of heatsink 1. Such an arrangement, in which air gaps are provided between rear-facing surface 102 of frame 100, and forward-facing surface 11 of main body 16 of heatsink 1, is shown in FIG. 5. In some embodiments, a resilient layer, which may be a thermally insulative resilient layer, may be provided between some portions of frame 100 and main body 16 of heatsink 1 (and/or between some portions of frame 100 and optional static heating and/or cooling element 20), as mentioned above.

Frame 100 and a cavity insert 200 may be configured so that, when the platens of an injection-molding process are brought together at high pressure, forwardmost surface 100 of cavity insert 200 may be positioned (along the "F-R" axis of heatsink 1) about even with, or slightly rearward from, forwardmost surface 201 of cavity insert 200 (as shown in the exemplary design of FIG. 5). Such an arrangement may provide that, when the platens are brought together, high force is preferentially transmitted into applied to cavity inserts 200 rather than a significant amount of the force being transmitted into frame 100.

Frame 100 may be made of any suitable material (e.g., metal), that can withstand the pressures and temperatures applied thereto. In some embodiments, frame 100 may be made of a material that has a specific heat capacity that is lower by at least 30% than that of the material of which main body 16 of heatsink 1 is made. In further embodiments, the material of frame 100 may have a specific heat capacity that is lower than the material of main body 16, by at least 40%, or 50%. In some embodiments, frame 100 may be made of a metal that has a thermal conductivity (i.e., thermal transmission coefficient) that is lower by at least 30% than that of the material of which heatsink 1 is made. In particular embodiments, if main body 16 of heatsink 1 is made of copper or copper alloy, frame 100 may be made of e.g. stainless steel, titanium, or a ceramic material.

Rear side 40 of heatsink 1 comprises at least one dynamic heat-transfer zone 50, as referred to previously herein and as depicted in exemplary manner e.g. in FIGS. 3 and 4. Multiple dynamic heat-transfer zones (or, alternatively viewed, regions of a single dynamic heat-transfer zone, there not necessarily being a firm dividing line between multiple heat-transfer zones and a single heat-transfer zone with multiple regions) may be provided and may be laterally offset from, or in some embodiments may collectively laterally surround, a rearward segment of a load-bearing path as discussed previously herein. By way of specific example, exemplary heatsink 1 as shown in FIGS. 3 and 4 comprises a dynamic heat-transfer zone 50 that comprises three (annular) dynamic heat-transfer regions 60, 70 and 80. The rearward segments of the load-bearing paths of heatsink 1 (as provided by load-bearing members 90) are circumferentially spaced around annular heat-transfer region 70 with areas of heat-transfer region 70 therebetween, with annular heat-transfer region 60 radially-outwardly bounding the rearward load-bearing path segments, and with annular heat-transfer region 80 radially inwardly bounding the load-bearing path segments. Thus, the rearward segments of the load-bearing paths are surrounded in all lateral directions (e.g., radially inwardly, radially outwardly, and circumferentially) by portions of dynamic heat-transfer zone 50. It will be further appreciated that in the illustrated embodiment of FIGS. 2 and 3, there are a plurality (eight) of load-bearing paths, and each rearward segment of each load-bearing path is a discrete load-bearing path segment that is separated from neighboring discrete load-bearing path segments by portions of dynamic heat-transfer zone 50 (specifically, by portions of dynamic heat-transfer region 80 of zone 50).

As discussed previously herein, dynamic heat-transfer zone 50 is configured to exchange thermal energy with a moving heat-transfer fluid and comprises a plurality of non-load-bearing dynamic heat-transfer fins with an aspect ratio of at least 2:1. In various embodiments, the aspect ratio of such fins may be at least 3:1 or 5:1.

In the exemplary embodiment of FIGS. 3 and 4, first, radially outermost dynamic heat-transfer region 60 (that is located radially outward from the plurality of load-bearing paths) comprises a plurality of fins 61, each with a long axis that extends generally circumferentially around heatsink 1, which fins are spaced radially inward-outward so as to provide flow channels 63 therebetween through which a moving heat-transfer fluid can flow. In some embodiments, a non-load-bearing sealing plate 400 may be provided at a rearmost position of heatsink 1 (and may be attached thereto by any suitable method, including e.g. welding) which may comprise front side 401 portions of which may provide a rearward closure for flow channels 63 of heat-transfer region 60, as shown in FIG. 3. In the particular embodiment shown in FIGS. 3 and 4, radially outwardmost wall 62 (which in this design corresponds to radially-outwardmost sidewall 15 of heatsink 1), as well as radially-inwardmost sidewall 72 of main body 16, extend slightly rearward past fins 61, so that sealing plate 400 may only contact (and be attached to) e.g. only to walls 62/15 and 72. Thus, a small gap may exist between rearmost faces of at least some fins 61 and front surface 401 of sealing plate 400. Thus, sealing plate 400 may not necessarily provide complete isolation between individual flow channels 63, nor may sealing plate 400 necessarily provide complete isolation between first dynamic heat-transfer region 60 and second dynamic heat-transfer region 70, as discussed below. However, as long as sufficient fluid flow through channels 63 and channels of the other dynamic heat-transfer regions may be achieved, the presence of such small gaps may not be problematic, and may even be used to advantage, as discussed below in reference to third dynamic heat-transfer region 80.

First dynamic heat-transfer region 60 may comprise heat-transfer fluid inlet 64 and outlet 65, which may be aligned with orifices 403 of sealing plate 400 so as to accept fluid-injection fitting 564 and fluid-exhaust fitting 565 (as shown in FIG. 1) so that a moving heat-transfer fluid may be injected into channels 63 of heat-transfer region 60, may flow along such channels, and may then be exhausted from such channels and removed from heatsink 1. (It is noted that in the illustrated embodiments, the designation of inlet and outlet could be reversed). In some embodiments, fins 61 and channels 63 of first dynamic heat-transfer region 60 may be configured so that moving heat-transfer fluid may be exhausted from first dynamic heat-transfer region 60 on a generally circumferentially-opposite side of heatsink 1 from which it enters (e.g., as in the exemplary designs of FIG. 3). Any suitable arrangement is possible, however.

In the exemplary embodiment of FIGS. 3 and 4, second, radially innermost dynamic heat-transfer region 70 (that is located radially inward from the plurality of load-bearing paths) comprises a plurality of fins 71 each with a long axis that extends generally circumferentially around heatsink 1, which fins are spaced radially inward-outward so as to provide flow channels 73 through which a moving heat-transfer fluid can flow. In some embodiments, sealing plate 400 may be provided at a rearmost position on heatsink 1 and which front side 401 portions thereof may provide a rearward closure for flow channels 73 of heat-transfer region 70, in similar manner as discussed above with regard to first heat-transfer region 60. Second dynamic heat-transfer region 70 may comprise heat-transfer fluid inlet 74 and outlet 75, which may be aligned with orifices 404 of sealing plate 400 so as to accept fluid-injection fitting 574 and fluid-exhaust fitting 575 (as shown in FIG. 1) so that a moving heat-transfer fluid may be injected into channels 73 of heat-transfer region 70, may flow along such channels, and may then be exhausted from such channels and removed from heatsink 1. (It is noted that in the illustrated embodiments, the designation of inlet and outlet could be reversed). However, in the specific embodiment shown in FIG. 1, fittings 574 and 575 of second heat-transfer region are arranged so that heat-transfer fluid may flow through channels 73 of second heat-transfer region 70 in a generally circumferentially opposite direction from that in which heat-transfer fluid flows through channels 63 of first heat-transfer region 60. This may enhance the uniformity of the overall dynamic heating/cooling of heatsink 1 that is collectively supplied by first and second dynamic heat-transfer regions 60 and 70. Fins 71 and channels 73 of second heat-transfer region 70 may be configured so that moving heat-transfer fluid may be exhausted from second heat-transfer region 70 of heatsink 1 on a generally laterally-opposite side of heatsink 1 from which it enters (e.g., as in the exemplary designs of FIG. 2). Any suitable arrangement is possible, however.

In the exemplary embodiment of FIGS. 3 and 4, third dynamic heat-transfer region 80 is provided that is sandwiched radially in between outermost first region 60 and innermost second region 70. In contrast to fins 61 and 71 of those regions, which are provided in the form of high aspect ratio ribs, at least some fins 81 of region 80 are provided in the form of high aspect ratio posts. It is repeated, however, that the term fin is used broadly to denote any structure of heatsink 1 that protrudes rearward from base 30 so as to be able to contact a moving heat-transfer fluid (whether or not such fluid is actually moving at any particular time during the operating of an injection-molding system comprising heatsink 1), and includes such posts. A further difference from first and second dynamic heat-transfer regions 60 and 70 is that in some embodiments, third dynamic heat-transfer region 80 may not necessarily be directly supplied with moving heat-transfer fluid (e.g., by way of a fluid-injection fitting that would directly feed moving fluid into region 80 in like manner to fluid-injection fittings 564 and 574 of the other two regions). Rather, in designs of the exemplary type shown in FIGS. 1-5, it has been found that in some cases providing a gap between the front side 401 of sealing plate 400, and rearmost surfaces of fins 61 of first heat-transfer region 60, and/or between the front side 401 of sealing plate 400 and rearmost surfaces of fins 71 of second heat-transfer region 70, may provide an adequate flow of heat-transfer fluid into and through third heat-transfer region 80. Thus, the concept of dynamic heat-transfer encompasses cases in which a fluid may be moving relatively slowly and/or in small quantities through e.g. third heat-transfer region 80. Such flow may be enhanced e.g. by providing fins 81 of third heat-transfer region 80 in the form of posts rather than in the form of elongated ribs. However, fins of any suitable type may be used. Moreover, if desired, fittings can be used to directly inject and/or exhaust heat-transfer fluid into and out of third heat-transfer region 80 in like manner to that described for first and second heat-transfer regions. Or, as detailed in the Example, a fitting that is used to inject heat-transfer fluid into one of the first or second heat-transfer regions can partially overlap into the third heat-transfer region so as to inject at least some heat-transfer fluid thereinto.

Given the above discussion, it is evident that non-load-bearing sealing plate 400 can be attached e.g. to rearmost surfaces of main body 16 of heatsink 1, so as to at least partially define a dynamic fluid-flow space in which is located at least a portion of first dynamic heat-transfer zone 50. In the illustrated embodiment, sealing plate 400 serves in combination with radially outerwardmost sidewall 15 and radially inwardmost sidewall 72 of main body 16 of heatsink 1 to define a dynamic fluid-flow space in which are located the first, second and third dynamic heat-transfer regions 60, 70 and 80 of dynamic heat-transfer zone 50. In other embodiments, sealing plate 400 may be omitted. For example, if rearmost portions of outwardmost sidewall 15 of heatsink 1, and/or various fins (e.g., 61, 71, and/or 81) are brought close to (e.g., within less than about one mm of) forward-facing surface 512 of mold support 500, surface 512 may effectively function to define such an interior space in the absence of sealing plate 400. However, it may not be desired to have surface 512 actually contact any of e.g. components 15, 61, 71, 72, or 81 of heatsink 1, since this might result in undesired thermal leakage in and out of heatsink 1.

It will be noted that embodiments in which a dynamic fluid-flow space and/or regions thereof are partially defined as described above may be best suited for cases in which the heat-transfer fluid is a gas, e.g. air. In cases in which the heat-transfer fluid is a liquid (e.g., oil) it may be advantageous that such spaces and/or regions be completely defined, i.e. sealed (except for such access points as are provided by heat-transfer fluid inlets and outlets) rather than partly defined. In such cases, sealing plate 400 may be designed e.g. to make a fluid-tight (e.g., leakproof) seal against any or all of the various above-mentioned fins, sidewalls and fluid-entry and exit fittings, as well as against the below-mentioned sleeves.

As shown in FIG. 2, third dynamic heat-transfer region 80 may comprise sleeves 82 which may be configured to receive e.g. attachable load-bearing members 90 as discussed above. Sleeves 82 may or may not be load-bearing and may or may not be in direct contact with members 90. In some embodiments sleeves 82 (whether or not they have an aspect ratio that allows them to meet the specific definition of a dynamic heat-transfer fin) may provide at least some amount of heat transfer between main body 16 of heatsink 1 and a heat-transfer fluid moving through third dynamic heat-transfer region 80. In at least some embodiments a main function of a sleeve 82 may be in receiving and/or stabilizing a load-bearing member 90. As such, a sleeve 82 may not necessarily need to be the same height as (that is, to extend rearward from base 30 of heatsink 1 as much as) e.g. fins 61, 71 or 81. Thus, some embodiments sleeves 82 may be lower in height than e.g. fins 81, by e.g. 20, 40, or 60%. In any case, in general it should be understood that any dynamic heat-transfer zone may also comprise structures therewithin that are not dynamic heat-transfer fins.

From the above explanations it will be understood that, although rearward segments of load-bearing paths (as provided by load-bearing members 90) may be interspersed along third heat-transfer region 80 of dynamic heat-transfer zone 50 of rear side 40 of heatsink 1, such load-bearing paths do not necessarily transmit any significant load to any heat-transfer region 80 of dynamic heat-transfer zone 50. That is, any such load-bearing path segment may e.g. pass through the load-bearing member 90 itself (and, e.g., out of rear face 92 of load-bearing member 90 into heatsink support 500) without any significant load being transmitted therefrom into any heat-transfer fins of the heat-transfer region.

Front side 10 of heatsink 1 may optionally comprise at least one static heat-transfer zone 13. By static heat-transfer zone is meant a zone that comprises at least one heat-transfer surface that is configured to be placed in intimate thermal contact with at least one static heating and/or cooling element 20 so that thermal energy can be exchanged between the static heating and/or cooling element 20 and the zone of the heatsink. By static heat-transfer is meant the transfer of thermal energy by conduction between intimately contacting, non-fluid surfaces of two materials, without any movement of the materials' surfaces relative to each other. In some embodiments, static heat-transfer zone 13 of front side 10 of heatsink 1 may comprise a plurality of discrete receptacles 14 that are each recessed rearward into a front side of main body 16 of heatsink 1 and that are each configured to exchange thermal energy with a static heating and/or cooling element that is positioned in the receptacle in intimate thermal contact with a surface of main body 16 of heatsink 1. In this context, intimate thermal contact includes the circumstance of a surface of the heating and/or cooling element being in direct physical contact with at least a portion of the surface of main body 16, and also includes the case in which a surface of the heating and/or cooling element is not in direct contact with a surface of main body 16, but is coupled (e.g., attached) thereto by a sufficiently thermally conductive material (e.g., a layer of solder, a layer of thermally conductive adhesive, or the like).

In some embodiments, a plurality of discrete static heat-transfer receptacles 14 may be laterally interspersed with a plurality of load-bearing paths of heatsink 1. By this is meant that any two adjacent load-bearing paths have at least one heat-transfer receptacle 14 provided laterally (e.g., radially, or circumferentially) therebetween. An exemplary embodiment of such a design is shown in detail in FIG. 2, in which a heat-transfer zone 13 and receptacle 14 thereof is seen to be laterally interspersed between any two (load-bearing) bosses 12 of heatsink 1. It will of course be appreciated that at least portions of individual static heat-transfer zones 13 may closely approach each other (for example, at radially-inwardmost locations of the heat-transfer zones, in the exemplary design of FIG. 2) and there may be no firm dividing line between a design with multiple individual static heat-transfer zones 13 and a single static heat-transfer zone 13 with multiple portions.

Given the presence of e.g. bosses 12 that may protrude forwardly, and receptacles 14 that may be recessed rearwardly, from base 30 of main body 16 of heatsink 1, it will be appreciated that the thickness (along the front-rear axis of heatsink 1) of base 30 may be varied as desired, over the lateral extent of base 30. That is, the thickness of base 30 may vary e.g. along a direction progressing radially outward toward a lateral sidewall of heatsink 1, and/or along a circumferential direction around base 30. For example, base 30 may be thicker in areas underlying bosses 12 and/or in areas underlying receptacles 14, than in other areas. And, base 30 may be thicker in areas toward the radial center of heatsink 1, than in radially outward areas (e.g., areas near sidewall 15) which outward areas may not be subject to as high forces during molding.

In the illustrated embodiment of FIG. 2, a receptacle 14 can be configured to retain a static, non-moving (relative to heatsink 1) heating and/or cooling element 20 so that the element is in intimate thermal contact with a portion of first major surface 11 of heatsink 1 so that thermal energy can be efficiently exchanged therebetween. (For clarity of presentation, only a single heating and/or cooling element 20 is shown in place in a receptacle 14 in FIG. 2; in the view of FIG. 1, all such heating and/or cooling elements 20 are shown in place and electrical connections thereof are also shown). In the illustrated embodiment of FIG. 2, receptacles 14 comprise elongated, generally linear cavities that extend along front side 10 of heatsink 1, from radially outwardmost sidewall/edge 15 of heatsink 1, radially inward past bosses 12, and that terminate proximate the lateral center of heatsink 1. (In this context, it is repeated that the term radially is used for convenience herein in describing directions inward toward, and outward from, the lateral center of heatsink 1 (e.g., the location occupied by through-opening 16 in the embodiment of FIG. 1), and does not imply that heatsink 1 has a strictly circular geometry.) Heating and/or cooling element 20 may be designed (as shown in FIG. 4) to closely fit into receptacle 14, e.g. with a snug fit so that intimate contact can be established between a rear-facing surface of heating and/or cooling element 20 and a forward-facing surface 11 of heatsink 1, within receptacle 14. Of course, intimate contact may also be established between minor edges of heating and/or cooling element 20 and sidewalls of receptacles 14, which may further enhance the exchange of thermal energy therebetween.

Heating and/or cooling element 20 may be held in place in receptacle 14 by any suitable method. If a bonding method is used (particularly if a bonding agent or layer is present at the interface between a rearward-facing surface of heating/cooling element 20 and a frontward-facing surface 11 of main body 16 of heatsink 1), such a bonding agent may advantageously comprise good thermal conductivity (e.g., may be solder, a thermally conductive adhesive, or the like). In some embodiments (whether or not a bonding agent is also used), heating and/or cooling element 20 may be held in place by pressure applied to the front surface of heating and/or cooling element 20. Conveniently, frame 100, which may serve to hold cavity inserts 200 in place as discussed earlier herein, may also serve to apply such pressure to heating and/or cooling elements 20. If desired, a resilient layer such a resilient fibrous web, foam, solid elastomeric material, or the like, may be provided between frame 100 and heating and/or cooling elements 20 (whether in the form of a single piece with areas abutting each heating and/or cooling element 20, or in the form of separate, individual pieces provided for each element) so as to more uniformly apply pressure to hold elements 20 in place. In some embodiments, such a resilient layer may comprise a relatively low thermal conductivity; e.g., by way of being fibrous, porous, etc., and/or by way of being comprised of non-metallic components (e.g., inorganic fibers such as ceramic fibers, or organic polymeric materials or fibers such silicone, long as such materials/fibers can tolerate the temperatures involved). Such a low-thermal-conductivity resilient layer may be particularly useful e.g. if it is desired to thermally isolate frame 100 from heatsink 1 and/or from heating and/or cooling element(s) 20 as much as possible.

Any suitable static heating and/or cooling element 20 can be used. In some embodiments, element 20 may be capable of both heating and cooling (by way of being, e.g., a Peltier device). In other embodiments, element 20 may be capable only of cooling. In other embodiments, element 20 may be capable only of heating. In specific embodiments, element 20 may be an electrical resistance heater. In other embodiments, element 20 may be e.g. a heat-pipe or any member with an internally-circulated heating or cooling fluid (as long as the surface of the element is a non-fluid, non-moving surface as discussed above). If desired, a non-load-bearing annular cover plate may be positioned forward of frame 100 and heatsink 1, which may contain or protect e.g. wires powering static heating and/or cooling element(s) 20. Such a plate may e.g. be fastened to annular rim 505 of heatsink support 500, by any suitable fastener(s).

From the above discussions it will be understood that a heatsink as disclosed herein is capable of being quickly cycled over wide temperature ranges by way of comprising at least one dynamic heat-transfer zone (and optionally, at least one static heat-transfer zone), and that has one or more load-bearing paths that intersect one or more molding cavities and that do not transmit a significant load into any dynamic heat-transfer features of the dynamic heat-transfer zone. This has the advantage that high aspect ratio dynamic heat-transfer components (e.g., fins) may be fragile and might be e.g. damaged by such high loads as might be imparted e.g. in injection molding of high aspect ratio parts, if such high aspect ratio components were present in a load-bearing path. It is noted that optional static heat-transfer zone 13 of first side 10 of heatsink 1 does not necessarily have to comprise high aspect ratio components.

It will be appreciated that it may be advantageous for main body 16 of heatsink 1 (e.g., comprising base 30, and e.g. various bosses, fins and sleeves protruding therefrom) to be made of a material that has a high thermal conductivity, in order that thermal energy can be efficiently transmitted into and/or removed therefrom by a moving heat-transfer fluid of a dynamic heat-transfer zone 50, and optionally by one or more static heating and/or cooling elements 20 of an optional static heat-transfer zone 13. However, it will also be appreciated that it may be advantageous for the material of main body 16 of heatsink 1 to have a low specific heat capacity. Given that such properties often correlate with each other, these conflicting requirements may be taken into account. Furthermore, main body 16 of heatsink 1 must comprise at least a certain strength and physical integrity, if for no other reason that a load-bearing path may pass through at least some small areas of the main body (e.g., through a boss 12 and/or through a portion of the base 30). Given all these issues, in some embodiments main body 16 of heatsink 1 may be made of metal. In particular embodiments, it may be made of a composition comprising copper or a copper alloy. In some embodiments, such a copper alloy may be a beryllium-copper alloy. In other embodiments, such a copper alloy may be a high-thermal-conductivity, beryllium-free copper alloy, as exemplified by materials available from Performance Alloys, Germantown, Wis. under the trade designation MOLDSTAR. In various embodiments, the material of main body 16 of heatsink 1 may comprise a thermal conductivity of at least about 100, 200, or 250 watts per meter per degree C.

Given the above-discussed advantages of minimizing the total heat capacity of heatsink 1 (which total heat capacity is an extensive property that scales with the amount of mass of heatsink 1), it is possible to characterize heatsink 1 in terms of the total thermal volume of heatsink 1, which total thermal volume will be understood as being directly correlated with the total thermal mass of heatsink 1 (i.e., with the total heat capacity of heatsink 1). As used herein, this total thermal volume, for ease of calculation, will be the volume only of main body 16 of heatsink 1 and integral components thereof. In the illustrated embodiments, this includes e.g. bosses 12, fins 61, 71, and 81, sleeves 82, sidewalls 15 and 72, and protrusions 18; and does not include the volume of other components such as load-bearing members 90, sealing plate 400, spacer 300, cavity inserts 200, or frame 100. Since many of these other components may be made of materials of lower specific heat capacity than main body 16, may occupy significantly lower volume than heatsink 1, and/or may be somewhat thermally isolated from heatsink 1 when they are configured according to the disclosures herein, this does not significantly detract from a thermal characterization that relies only on main body 16 of heatsink 1. Such a total thermal volume may be obtained e.g. by measurement or by calculation using the known dimensions of a heatsink, or may be obtained e.g. by weighing the heatsink main body and using the specific gravity of the material to calculate the volume thereof.

Given also the above-discussed advantages of maximizing the dynamic heat-transfer capability of heatsink 1, it is also possible to characterize heatsink 1 in terms of its total dynamic heat-transfer surface area (e.g., as collectively provided by heat-transfer fins 61, 71 and 81, in the illustrated embodiments). Such a total dynamic heat-transfer surface area can be obtained by measurement or calculation using the known dimensions of the dynamic heat-transfer fins of the heatsink. Surfaces that are exposed to little or no heated or cooled heat-transfer fluids and/or that have very little contact with heatsink main body 16 (e.g., an outward surface of sidewall 15, surfaces of sealing plate 400 if present, an inward surface of through-hole 77, and inner surfaces of sleeves 82 (unless exposed to moving fluid) may be neglected.

The total dynamic heat-transfer surface area of heatsink 1 may be compared to the total thermal volume of heatsink 1. Specifically, a ratio can be provided of the total dynamic heat-transfer surface area of heatsink 1 to the total thermal volume of heatsink 1. In various embodiments, the total dynamic heat-transfer surface area of heatsink 1 may be at least 500, 1000, or 1500 $cm^2$, the total thermal volume of heatsink 1 may be at most about 100, 200, or 300 $cm^3$, and the ratio of total dynamic heat-transfer surface area to total thermal volume may be at least about 1, 2, 4, 6, or 8 $cm^2$ of dynamic heat-transfer surface area per $cm^3$ of total thermal volume.

A total dynamic heat-transfer surface area of a heatsink, as disclosed above, can also be compared to a total load-bearing contact area of a heatsink, which total load-bearing contact area is provided by rear-facing surfaces of a load-bearing member or collectively by multiple load-bearing members. (Such surfaces may be e.g. surfaces 92 of load-bearing members 90, that collectively contact e.g. mold support 500.) In various embodiments, the ratio of the total dynamic heat-transfer surface area to the total load-bearing contact area may be at least 20, 40, 80, or 160 $cm^2$ of dynamic heat transfer surface area per $cm^2$ of total load-bearing contact area.

Heatsink 1 and various components thereof and components provided therewith, may be used with any suitable injection-molding system. It may be convenient that heatsink 1 be supported by (e.g., attached to) a heatsink support as disclosed herein. Conveniently, such a heatsink support may be attached to, and supported by, a conventional mold base (not shown in any Figure) which mold base may be attached to and supported by a platen of an injection-molding system in a manner well-known to the ordinary artisan. (It should be emphasized that the herein-disclosed heatsink support 500 is a representative illustration and that any suitable apparatus may be used to support heatsink 1 in connection with an injection molding system.) Molding surfaces provided by the heatsink (e.g., by one or more cavity inserts thermally coupled to the heatsink main body as described earlier herein) thus may collectively correspond to a first mold component (often referred to as an "A" side or "A" plate) of an injection molding system. In such cases the platen that supports the heatsink may be a first, non-moving platen.

Such an injection molding system may comprise a second platen that supports (e.g., by way of a second, conventional mold base) a second mold component (e.g., mold component 600 as shown in partial view in FIG. 5) that is positioned forward of heatsink 1 and that comprises a surface that faces toward front side 10 of heatsink 1, at least a portion of which second mold component 600 provides a molding surface 601 that combines with a molding surface 205 provided by heatsink 1 to at least partially define at least one mold cavity 604 when the first platen and the second platen are brought together. In some embodiments, the second platen may be movable toward the first platen into a first position in which at least one mold cavity is defined by the mated first and second mold components, and away from the first platen into a second position in which a molded part can be removed from the mold cavity (in which case the second mold component is of the type often referred to as a "B" side or plate). In other embodiments, heatsink 1 may be supported by a movable platen, e.g. may be present on the so-called B side of an injection-molding system. In some embodiments, both the A and B sides of an injection-molding system may comprise a heatsink as disclosed herein.

Any suitable apparatus may be used to melt polymeric resin and feed the molten resin into the mold cavity(s); e.g., a reciprocating screw apparatus, a screw-over-plunger apparatus, etc. Conveniently, any or all of main body 16 of heatsink 1, heatsink support 500, sealing plate 400, and frame 100, may comprise through-holes into and/or through which a resin-injecting apparatus (e.g., a nozzle or sprue fed by the resin-melting apparatus) may extend. Such through-holes may be aligned with each other, e.g. at or near the lateral center of heatsink 1, heatsink support 500, sealing plate 400, and frame 100 (as respectively exemplified by through-holes 77, 517, 406, and 105, in the illustrative embodiment of FIGS. 1-4). In some embodiments, second (B side) mold component 600 may comprise runners 602 (as shown in FIG. 5) by way of which molten resin (fed e.g. from a location near the lateral center of heatsink 1) can be divided and distributed into a plurality of discrete molding cavities. In some embodiments, the A-side mold component (e.g., the cavity insert(s) and/or the heatsink main body, etc.) may comprise runners; or, channels in both the A and B sides may combine to provide runners. Second mold component 600 may also comprise one or more ejector members 603 that are movable (relative to mold component 600) so that molded parts can be ejected from second mold component 600 when second mold component 600 is in a second position in which it is separated from the first platen to facilitate demolding. Such ejector members may comprise any suitable member (e.g., pins, blades, bars, rings, etc.).

In some embodiments, so-called hot-drop injection apparatus may be used (whether or not a single mold cavity is used, or a plurality of discrete molding cavities). It will be appreciated that hot-drop molding may avoid the use of runners and the like (by way of the molten resin being injected directly into one or more individual molding cavities).

In various embodiments, the total volume of an individual mold cavity (as exemplified by e.g. cavity 604 shown in FIG. 5), exclusive of runners etc., may be less than about 100 cubic mm, 50 cubic mm, 10 cubic mm, or 1 cubic mm. In alternative embodiments, the total volume of an individual mold cavity (as exemplified by e.g. cavity 604 shown in FIG. 5), exclusive of runners etc., may be greater than about 100 cubic mm, 1000 cubic mm, or 100 cubic cm.

A heatsink, components thereof, and components provided therewith, may be used in an injection molding operation according to the following general methods. A heatsink may be supported e.g. by a first platen and may provide a first (e.g., A-side) mold component that provides at least one molding surface. The heatsink may be heated (whether by static heating and/or by dynamic heating or by a combination of both methods) so as to cause the at least one molding surface (which molding surface may be supplied e.g. by a cavity insert to which the heatsink main body is thermally coupled) to be brought to a first, high temperature. The first platen, and a second platen, may be brought toward each other (regardless of which platen is moved, although customarily the second, B-side platen is moved) into a first position in which the at least one molding surface provided by the first mold component, and at least one molding surface provided by a second (e.g., B-side) mold component supported by the second platen, combine to define at least one mold cavity. Such moving of a platen or platens may occur after the first, high temperature is reached; or, while such a temperature is being approached. Molten resin can then be injected into the at least one mold cavity after at least the molding surface of the first component (that is, provided by the heatsink) reaches at least the first, high temperature. (It is noted that the temperature control may not necessarily be exact and that e.g. some overshoot may occur; and, it may not be necessary that the molding surface temperature actually be measured, since e.g. it may be clear from the results of the molding process an appropriate first, high temperature was reached.)

At a desired time (e.g. after the mold cavity is sufficiently filled with molten resin), the heatsink can be cooled (whether by static cooling and/or by dynamic cooling or by a combination of both methods) so as to cause the at least one molding surface of the first mold component to be brought to a second, low temperature that is lower than the first, high temperature by e.g. at least 10 degrees C. (In various embodiments, the second temperature is lower than the first temperature by at least 20, 40, or 80 degrees C.) The resin within the at least one mold cavity can then be allowed to cool and solidify to form a molded part. After the resin has sufficiently solidified, the first and second platens can be moved away from each other into a second position in which the molded part can be removed (often, such processes are designed so that a molded part will remain with the B-side mold component of the movable platen, until ejected therefrom e.g. by ejector members). It is noted that in the above steps, actual temperatures of mold components may be monitored; or, lengths of time needed for various steps can be ascertained by experimentation and the molding process can then be performed by use of timed steps, without temperature monitoring being used.

Within these general principles, particular methods can be performed that may be enhanced by the features and properties of the heatsink. For instance, in some embodiments the second mold component (i.e., conventional molding surfaces thereof, runner surfaces thereof, etc.) may be heated and cooled along with the heatsink (although not necessarily to the exact same temperatures). In other embodiments, the temperature of the second mold component may be controlled to a relatively constant nominal setpoint (as in the Example herein) that may be lower than the second, low temperature to which the heatsink is cooled by at least 10, 20, 30, or 50 degrees C. (It will be realized that the temperature of any mold component surface may increase momentarily, e.g. from a nominal setpoint, when the surface is contacted by molten resin.) If such methods are used, the heatsink may be heated to the first, high temperature while the two platens are in the second position (in which they are separated from each other). In this manner the heatsink may be heated without any (undesirable) thermal leakage to the second mold component. The platens may then be brought toward each other to form the mold cavity(s), and the molten resin injected thereinto, which process in many cases may take only a few seconds.

Thus, only e.g. a few seconds of time may pass during which undesired thermal leakage from the "hot" heatsink, to the "cold" second mold component, may occur. It will be appreciated that once the cooling cycle begins, it may actually be advantageous to have colder (relative to the heatsink) second mold component surfaces in contact with the resin within the mold cavity and/or in contact with surfaces of the heatsink (e.g., with surfaces of a cavity insert and/or a frame that holds the cavity insert on the heatsink), in order to accelerate the cooling of the heatsink and/or the resin.

Given these factors, it may be advantageous in some circumstances to bias the second mold component (i.e., at least molding surfaces thereof) to a relatively cold (nominally) constant setpoint as described above. It will be appreciated that although molding surfaces (as well as runners and the like) provided by the second mold component may thus be significantly colder than the molding surfaces provided by the heatsink, this may not be problematic as long as such second mold component surfaces are at least warm enough that the molten resin does not unacceptably thicken or solidify so as to interfere with filling of the mold cavity(s). In particular, if e.g. high aspect ratio subcavities, microfeature-molding subcavities, etc. (as described later herein) are present in the molding surfaces provided by the heatsink, keeping such heat-sink-provided molding surfaces at a high temperature may be quite important, while keeping the surfaces of the second mold component at such high temperatures may not be as important. Thus, a simplified, and potentially faster, mode of operation can be used, in which the second mold component can be held at a nominally constant lower temperature (or, can be subjected to a fairly limited temperature change as achieved by e.g. by conventional heating and cooling), even as the heatsink is subjected to relatively wide temperature cycles. It should be emphasized, however, that this mode of operation is only a non-limiting, exemplary embodiment that may be advantageous in some particular circumstances.

In various embodiments, heating of the heatsink may be performed by dynamic heating alone, by static heating alone, or by a combination of dynamic and static heating. In further embodiments, cooling of the heatsink may be performed by dynamic cooling alone, by static cooling alone, or by a combination of dynamic and static cooling. In some specific embodiments, both heating and cooling of the heatsink may be performed by dynamic methods (e.g., using oil as a heat-transfer fluid). In such cases, the only heating that is performed may be dynamic heating; or, static heating may optionally be used to assist the dynamic heating. In other specific embodiments, heating of the heatsink may be performed by static heating, and cooling of the heatsink may be performed by dynamic cooling. For example, static heating may be performed while the first and second platens are in their second, separated position, which heating may take e.g. from a few seconds to a minute or more, depending e.g. on the thermal mass of the heatsink and associated components, and depending on the first, high temperature to which the molding surface is desired to be brought. The platens may then be brought together into the first position e.g. when a desired first, high temperature of a molding surface is reached. Molten resin may then be injected (which process may only take a few seconds; the static heating may be turned off, or kept on, during this process, as desired). After the resin is injected, and while the platens are held together in the first position, the heatsink may be dynamically cooled, which process again may take e.g. from a few seconds to a minute or more. When the molded resin has cooled sufficiently, the platens may be separated into their second position and the molded part removed. The cycle may then reinitiate, starting with static heating of the heatsink (which process may in fact start even while the molded part is being removed from the second mold component).

As evidenced by the Working Examples herein, the use of a heatsink of the exemplary type disclosed in FIGS. 1-5, weighing approximately 1.6 kg and replacing a conventional copper molding block weighing approximately 20 kg, and used (with static heating and dynamic cooling) to produce parts with molded microfeatures, allowed injection molding cycle times to be reduced from about 70 seconds down to about 45 seconds. Such reductions may offer large improvements in productivity and cost reduction.

It will also be appreciated that the properties of the herein-disclosed heatsink may offer further advantages. For example, a molding cycle can be used in which, toward the end of a static heating step (e.g., as the molding surface approaches the first, high temperature), dynamic cooling can be initiated even while the static heating process continues. Thus, the dynamic cooling may initiate cooling of the rearside fins of the heatsink, even as the front-side static heating continues for a short time longer. Such an operation may maintain the molding surfaces at a sufficiently high temperature for long enough to facilitate acceptable mold-filling, even as the dynamic cooling of the rearside of the heatsink establishes a temperature gradient that may allow the subsequent cooling process to be more rapid. Such modes of operation may shorten molding cycle times, even if e.g. only for a few seconds (which, in some operations, may be significant).

As referred to earlier, the methods and apparatus referred to herein may find use in any application involving microflow molding, which was defined as encompassing any circumstance in which molten resin may flow in proximity to (e.g., between) generally oppositely-facing mold cavity surfaces that, at any particular location, are closer to each other than about 250 microns. It will be appreciated that this may occur in various circumstances. One such circumstance may arise in micromolding, which in this context refers to the molding of finished parts that are less than about 100 cubic millimeters in total volume (not including solidified resin in runners etc.). An example of this would be a part molded by mold cavity 604 as pictured in the exemplary illustration of FIG. 5, if mold cavity 604 were to have a total volume of less than about 100 cubic millimeters (and with generally oppositely-facing surfaces 601 and 205 being less than about 250 microns (0.25 mm) apart at least at one location). In various embodiments, the apparatus and methods disclosed herein may be used in the micromolding of finished parts with a total volume of less than about 50, 10, or 1 cubic millimeter.

Another circumstance in which microflow molding may arise is in the molding of parts that, while comprising a total volume greater than about 100 cubic millimeters, comprise one or more molded microfeatures. In this context, a molded microfeature is a feature that is integrally molded with a (larger) molded part and which microfeature protrudes from the larger part and comprises a volume of less than about 100 cubic millimeters (as measured relative e.g. to an imaginary boundary between the microfeature and the rest of the molded part). Such molded microfeatures may be achieved by providing one or more micro-subcavities within a larger mold cavity. An example of this would be if a subcavity 206 of mold cavity 604 of FIG. 5 were to comprise a volume of less than about 100 cubic millimeters (regardless of the total size of mold cavity 604) and with generally oppositely-facing surfaces of subcavity 206 being less than about 250 microns (0.25 mm) apart at least at one location. (In this context, it is noted that the sloping walls of the subcavity would qualify as generally oppositely-facing surfaces.) In various embodiments, the apparatus and methods disclosed herein may be used in the molding of finished parts comprising one or more molded microfeatures each with a volume of less than about 50, 10, 1, 0.1, or 0.01 cubic millimeter.

It will be recognized that microflow molding may arise particularly in the molding of a high aspect ratio item (whether such an item is a finished part, e.g. a micromolded part, or is a portion of a part, e.g. a molded microfeature of a larger molded part). By high aspect ratio is meant that an item has a ratio of a longest dimension to a shortest dimension (as exemplified by e.g. the ratio of the length of a cylinder to the diameter of the cylinder) of at least about 4:1. (In the case of variable geometry, an average value of e.g. the shortest dimension, over the length of the longest dimension, can be used.). An example of this would be a molded item formed by subcavity 206 of mold cavity 604 of FIG. 5, if subcavity 206 were to be e.g. a sloping-walled, flat-bottomed cylindrical cavity with a smallest diameter (at the flat bottom) of 25 microns, a largest diameter (at the open end) of 45 microns, and a depth (from the open end to the flat bottom) of 200 microns. (In this context it is noted that the cross-sectional view of FIG. 5 is a representative illustration that is not to scale). In further embodiments, the aspect ratio of such a high aspect ratio molded item may be at least 6:1, 8:1, or 10:1.

In summary, it will be understood that microflow molding may arise in many circumstances, e.g. in the production of any molded item of which at least a portion is sufficiently thin-walled. Furthermore, it will be appreciated that there may be no firm dividing line between the above-described exemplary circumstances. For instance a micromolded part (of less than about 100 microliters in total volume) may itself comprise one or more molded microfeatures protruding therefrom. Thus, the above discussions serve as illustrative descriptions rather than providing e.g. limiting categories.

List of Exemplary Embodiments

1. An apparatus for use in injection molding, comprising: a heatsink with a main body with a base, and with a front side and a rear side and a front-rear axis and lateral axes, and with at least one load-bearing path that extends generally parallel to the front-rear axis of the heatsink so as to intersect a molding surface on the front side of the heatsink and that comprises at least a frontward segment and a rearward segment; wherein at least a portion of at least one non-load-bearing, dynamic heat-transfer zone of the rear side of the heatsink is laterally offset from the rearward segment of the load-bearing path; and wherein the dynamic heat-transfer zone comprises dynamic heat-transfer fins that extend generally rearward from the base of a main body of the heatsink and that collectively comprise a dynamic heat-transfer surface area, and wherein the main body of the heatsink comprises a total thermal volume, and wherein the ratio of the dynamic heat-transfer surface area to the total thermal volume is at least 1 $cm^2/cm^3$.

2. The apparatus of embodiment 1 wherein the rearward segment of the load-bearing path is laterally surrounded by portions of the at least one non-load-bearing, dynamic heat-transfer zone of the rear side of the heatsink.

3. The apparatus of embodiment 1 wherein the at least one load-bearing path is a plurality of load-bearing paths, and wherein each rearward segment of each load-bearing path is a discrete load-bearing path segment that is separated from neighboring discrete load-bearing path segments by portions of the dynamic heat-transfer zone of the heat sink.

4. The apparatus of embodiment 3 wherein each discrete rearward segment of each load-bearing path is provided by a load-bearing member that is attached to a main body of the heatsink.

5. The apparatus of embodiment 4 wherein the material of which each load-bearing member is made has a thermal conductivity that is lower than the thermal conductivity of the material of which the main body of the heatsink is made, by at least 30%.

6. The apparatus of any of embodiments 4-5 wherein at least a forwardmost portion of each load-bearing member is positioned within a rearwardly-open-ended receptacle that is at least partially defined by a non-load-bearing hollow sleeve that protrudes rearwardly from the main body of the heatsink and that is integral with the main body of the heatsink.

7. The apparatus of any of embodiments 1-6 wherein the ratio of the dynamic heat-transfer surface area of the heatsink to the total thermal volume of the main body of the heatsink is at least 4 $cm^2/cm^3$.

8. The apparatus of any of embodiments 1-7 wherein at least some of the dynamic heat-transfer fins comprise a height-to-thickness aspect ratio of at least 3:1.

9. The apparatus of embodiment 3 wherein the at least one dynamic heat-transfer zone comprises a first dynamic heat-transfer region that is located radially outward from the plurality of discrete load-bearing path segments, and a second dynamic heat-transfer region that is located radially inward from the plurality of discrete load-bearing path segments, and a third dynamic heat-transfer region that is radially sandwiched in between the first and second dynamic heat-transfer regions and along which the plurality of discrete load-bearing path segments are circumferentially spaced.

10. The apparatus of any of embodiments 1-9 wherein the molding surface of the front side of the heatsink comprises a projected area, and wherein the rearward segment of the load-bearing path comprises a projected area that is at least about 80% of the projected area of the molding surface.

11. The apparatus of any of embodiments 1-10 wherein the molding surface of the front side of the heatsink comprises a projected area, and wherein the rearward segment of the load-bearing path comprises a projected area that overlaps 100% of the projected area of the molding surface.

12. The apparatus of any of embodiments 1-11 wherein the front side of the heatsink comprises at least one static heat-transfer zone.

13. The apparatus of embodiment 12 wherein the at least one static heat-transfer zone comprises a plurality of discrete receptacles that are recessed rearward into a front side of a main body of the heatsink and that are each configured to exchange thermal energy with a static heating and/or cooling element that is positioned in the receptacle in intimate thermal contact with a surface of the main body of the heatsink.

14. The apparatus of embodiment 13 wherein the static heating and/or cooling elements are electrical-resistance heating elements.

15. The apparatus of any of embodiments 1-14 wherein the at least one load-bearing path is a plurality of load-bearing paths, and wherein the front side of the heatsink comprises a plurality of discrete molding surfaces each of which is intersected by a separate load-bearing path of the plurality of load-bearing paths of the heatsink.

16. The apparatus of embodiment 15 wherein each of the discrete molding surfaces is individually located on one of a plurality of discrete bosses that protrudes forwardly from a front side of a main body of the heatsink, each of which boss is a part of a frontward segment of a load-bearing path of the heatsink.

17. The apparatus of embodiment 16 wherein the front side of the heatsink comprises a static heat-transfer zone comprising a plurality of discrete receptacles that are recessed rearward into a front side of the main body of the heatsink and that are each configured to exchange thermal energy with a static heating and/or cooling element positioned in the receptacle in intimate thermal contact with a surface of the main body of the heatsink, and wherein the receptacles of the plurality of receptacles are circumferentially interspersed with the bosses of the plurality of discrete bosses.

18. The apparatus of any of embodiments 15-17 wherein each of the discrete molding surfaces is provided by a forward-facing molding surface of a cavity insert that is individually positioned on the front side of the main body of the heatsink.

19. The apparatus of embodiment 18 further comprising a frame that is positioned forward of the front side of the heatsink and that is attached to the heatsink so as to hold each cavity insert in position.

20. The apparatus of any of embodiments 1-19 wherein the at least one load-bearing path is a plurality of load-bearing paths, wherein each rearward segment of each load-bearing path is a discrete load-bearing path segment, and wherein the apparatus further comprises a heatsink support to which the heatsink is attached so that discrete, rear-facing surfaces of the rear side of the heatsink, each of which is part of a rearward, discrete load-bearing path segment of the heatsink, each contact a forward-facing surface of the heatsink support to provide a load-bearing interface therebetween.

21. The apparatus of embodiment 20 wherein each discrete, rear-facing surface of the rear side of the heatsink is provided by a rear-facing surface of a load-bearing member, which load-bearing member is attached to the rear side of a main body of the heatsink and is made of a material with a thermal conductivity that is lower than the thermal conductivity of the material of which the main body of the heatsink is made, by at least 30%.

22. The apparatus of embodiment 21 wherein the rear-facing surfaces of the plurality of load-bearing members collectively provide a load-bearing contact area with the heatsink support, and wherein the ratio of the dynamic heat-transfer surface area of the heatsink to the total load-bearing contact area of the load-bearing members is at least 20.

23. The apparatus of any of embodiments 1-22 wherein the molding surface comprises at least one microfeature-molding subcavity.

24. The apparatus of any of embodiments 1-23 wherein the molding surface comprises at least one subcavity with an aspect ratio of at least about 4:1.

25. The apparatus of any of embodiments 1-24 wherein the heatsink is supported by a first platen and provides a first mold component with at least one first molding surface, and wherein the apparatus further comprises a second platen that comprises a second mold component with at least one second molding surface that combines with the at least one molding surface of the first mold component to at least partially define at least one mold cavity when the first platen and the second platen are brought together.

26. The apparatus of embodiment 25 wherein the first platen is stationary and the second platen is movable toward the first platen into a first position in which the at least one mold cavity is defined, and away from the first platen into a second position in which a molded part can be removed from the mold cavity.

27. The apparatus of embodiment 26 wherein the at least one mold cavity is a plurality of discrete mold cavities and heatsink comprises at least one through-hole configured to allow a molten resin injection system to insert molten resin therethrough, and wherein the second mold component comprises runners through which the injected molten resin can be divided and distributed into the discrete molding cavities.

28. A method of injection molding, comprising: providing a first platen that comprises a first mold component comprising a heatsink with a main body with a base, and with a front side and a rear side and a front-rear axis and lateral axes, and with at least one load-bearing path that extends generally parallel to the front-rear axis of the heatsink so as to intersect an at least one first molding surface on the front side of the heatsink and that comprises at least a frontward segment and a rearward segment; wherein at least a portion of at least one non-load-bearing, dynamic heat-transfer zone of the rear side of the heatsink is laterally offset from the rearward segment of the load-bearing path; and wherein the dynamic heat-transfer zone comprises dynamic heat-transfer fins that extend generally rearward from the base of a main body of the heatsink and that collectively comprise a dynamic heat-transfer surface area, and wherein the main body of the heatsink comprises a total thermal volume, and wherein the ratio of the dynamic heat-transfer surface area to the total thermal volume is at least 1 $cm^2/cm^3$; heating the heatsink so as to cause the at least one first molding surface to be brought to a first, high temperature; bringing a second platen together with the first platen, into a first position in which the at least one molding first surface of the first mold component, and at least one second molding surface of a second mold component supported by the second platen, combine to define at least one mold cavity that intersects the at least one load-bearing path of the heatsink; injecting molten resin into the at least one mold cavity; dynamically cooling the heatsink so as to cause the at least one first molding surface to be brought to a second, low temperature that is lower than the first, high temperature by at least 10 degrees C.; allowing the resin within the at least one mold cavity to cool and solidify to form a molded part; and, moving the first and second platens away from each other into a second position in which the molded part can be removed from the mold cavity.

29. The method of embodiment 28 wherein the front side of the heatsink comprises at least one static heat-transfer zone and wherein the step of heating of the heatsink is performed by one or more static heaters that are in intimate thermal contact with the heatsink.

30. The method of any of embodiments 28-29 wherein the at least one non-load-bearing, dynamic heat-transfer zone of the rear side of the heatsink is used only for cooling the heatsink and not for heating the heatsink.

31. The method of any of embodiments 28-30 wherein the step of dynamically cooling the heatsink is begun during the time that the step of using the at least one static heater to heat the heatsink is still in progress.

32. The method of any of embodiments 28-29 and 31 wherein the at least one non-load-bearing, dynamic heat-transfer zone of the rear side of the heatsink is used for both cooling and heating the heatsink.

33. The method of any of embodiments 28-33 wherein the step of bringing the second platen together with the first platen into the first position to form the mold cavity is performed after the at least one first molding surface is heated to at least the first, high temperature.

34. The method of any of embodiments 28-33 wherein the second mold component is controlled to a nominally constant temperature that is at least 10 degrees C. lower than the second, low temperature of the at least first molding surface of first mold component.

35. The method of any of any of embodiments 28-34 using the heatsink of any of claims 1-25.

EXAMPLES

Apparatus

A heatsink and associated components therewith, were produced of a design generally as shown in FIGS. 1-4. (All references to Figure elements that follow are for convenience of description and do not imply that the described item is an identical match with the numbered item referred to in the Figures.) The main body of the heatsink was generally as exemplified by item 40 of FIGS. 2, 3, and 4, and was machined from a block of high thermal conductivity (approximately 260 Watts per meter per degree C.), beryllium-free copper alloy obtained from Performance Alloys, Germantown, Wis. under the trade designation Moldstar 150. The main body of the heatsink comprised a nominal diameter of approximately 14 cm (not including perimeter protrusions 18), and comprised a front-rear nominal thickness of approximately 21 mm (as measured from the front surface 11 to rearmost surfaces of outermost walls 62, not including the thickness of bosses 12). The forward side of the main body comprised eight circumferentially-spaced-apart bosses generally as exemplified by items 12 of FIG. 2; each boss protruded forwardly approximately 2 mm from the front surface of the main body and was approximately 18 mm in diameter. The main body comprised a base portion with an average thickness in the range of approximately 5-8 mm. The base portion approached the upper end of this thickness range in areas underlying each boss and in areas circumferentially flaring from each boss to the radially inward and radially-outward ends of each neighboring receptacle, and in areas underlying each receptacle (noting that the total thickness of e.g. 8 mm does not take into account the depth of the receptacle itself). The base portion approached the lower end of this thickness range in areas flaring radially outward from each boss to the radially outwardmost edge of the heatsink main body. The backside of the main body comprised three dynamic heat-transfer annular regions, two of which regions comprised circumferentially-elongated fins generally as exemplified by items 61 and 71 of FIGS. 3 and 4, which fins protruded rearward from the base portion of the main body and were of approximately 1.5 mm (radial) thickness and defined fluid-flow paths that were approximately 2 mm radial thickness therebetween. A third dynamic heat transfer annular region was radially sandwiched between the first two regions and comprised fins in the form of posts; this region also comprised eight sleeves (each of approximately 14 mm internal diameter) that were circumferentially spaced around the annular region generally as shown in FIGS. 3 and 4. A sealing plate (a copper plate of approximately 1.5 mm thickness) of the type exemplified by item 400 of FIG. 3 was positioned on the backside of the heatsink, and radially-outermost perimeter edges of the sealing plate were welded to rearwardmost surfaces of radially outermost wall 62 of the main body of the heatsink. The radially innermost edges of the sealing plate were welded to radially-innermost sidewall 72 of the main body of the heatsink, and the perimeter edges of openings 405 were welded to the rearmost surfaces of sleeves 82 of the main body of the heatsink.

The main body of the heatsink comprised a total thermal volume, calculated as described previously herein, of approximately 177 cubic centimeters. The main body of the heatsink comprised a total dynamic heat-transfer surface area, calculated as described previously herein, of approximately 832 square cm.

Eight cavity inserts were produced (of nickel) of the general type exemplified by items 200 of FIG. 2. Each cavity insert was placed upon the surface of a boss and all cavity inserts were held thereon by way of a titanium frame of the general design exemplified by item 100 of FIGS. 1 and 2. The titanium frame was attached to the main body of the heatsink by way of screws that passed through holes of the frame and that threadably engaged into holes of the main body of the heatsink. Each cavity insert was designed to provide (when a surface of a second mold component was brought against the forward-facing sides of the cavity inserts so as to define the molding cavities) a molding cavity of approximately 12.5 cm in diameter (with a projected area of approximately 1.26 cm$^2$) and approximately 0.7 mm in thickness, the molding cavity comprising numerous microfeature-molding subcavities, in generally similar manner to the representative illustration of FIG. 5.

Prior to the titanium frame being attached to the heatsink main body, eight ceramic, electrical-resistance heaters (as exemplified by item 20 of FIG. 2) obtained from Watlow of St. Louis, Mo. under the trade designation ULTRAMIC® Advanced Ceramic Heaters were placed into eight receptacles (as exemplified by items 14 of FIG. 2) on the front side of the main body of the heatsink. A high-temperature-stable, graphite-containing gasket of approximately 1.5 mm in thickness (obtained from McMaster-Carr of Aurora, Ohio) was placed forward of each heater, and a resilient silicone pad of approximately 1.5 mm in thickness (obtained from McMaster-Carr of Aurora, Ohio) was placed forward of each graphite-loaded gasket. These layers provided that when the titanium frame was tightened to the main body of the heat sink, pressure was applied to each heater to hold it securely against the main body of the heatsink for optimum conductive transfer of thermal energy between the heater and the heatsink, without excessive conductive leakage of thermal energy into the titanium frame.

In this manner was provided a heatsink comprising a main body, with cavity inserts and electrical-resistance heating elements on the forward side thereof, held in place by a titanium frame, which assembly could then be inserted into a heatsink support.

A heatsink support was produced of the general type exemplified by item 500 of FIG. 1. The heatsink support comprised a main body made of copper, with a forward-facing open-ended cavity 510 configured to accommodate the heatsink, and with eight receptacles 503 configured to accept eight titanium plugs (of the general type exemplified as item 90 of FIG. 3, and comprising a thermal conductivity in the range of approximately 7 W/m-K), forward portions of which plugs were press-fit into sleeves 82 on the rearward side of the main body of the heatsink and rearward portions of which plugs were seated into receptacles 503 of the heatsink support. Each titanium plug comprised a forward-rearward through-hole of the type exemplified by item 93 of FIG. 3. Screws were forwardly inserted through through-holes 506 in each receptacle of the heatsink support and were passed through the through-holes of each titanium plug and were threadably engaged into receiving holes 85 in the main body of the heatsink. The heads of these screws were located rearward of receptacles 503 of the heatsink support so that when the screws were tightened they drew the heatsink, the titanium plugs, and the heatsink support together and secured the heatsink and plugs in place against the heatsink support.

The area of each titanium plug throughout the majority of the front-rear length of the plug was approximately 1.43 cm$^2$. Because the front and rear end of each plug was slightly chamfered (not shown in any Figure), the area of each plug at each end was approximately 1.21 cm². (The total load-bearing contact area (against the heatsink support) collectively provided by the rear-facing surfaces of the eight titanium plugs was thus approximately 11.5 square cm). In view of the above-presented projected area of each molding cavity being approximately 1.26 cm², each titanium plug, along most of its front-rear length, comprised a projected area that was approximately 114% of the projected area of the molding cavity (and that fully overlapped the projected area of the molding cavity). Each titanium plug comprised, at a point of minimum cross-sectional area of the plugs (i.e., at a chamfered an end face of the plug), a projected area that was approximately 95% of the projected area of the molding cavity and that overlapped the projected area of the molding cavity this same amount.

An aluminum spacer ring (generally similar to item 300 of FIG. 1) was placed between the perimeter of the heatsink and a forward-facing annular ledge 519 of the heatsink support, and screws were passed through holes in perimeter protrusions 18 of the heatsink and threaded into holes 521 provided in the annular ledge, so as to secure the perimeter of the heatsink to the heatsink support, with spacer 300 therebetween, in similar manner as shown in FIG. 1.

Wires were threaded through a through-hole (e.g., of the type exemplified by item 513 of FIG. 1) in the heatsink support and were connected to the eight above-described electrical-resistance heaters. A non-load-bearing annular aluminum cover plate (not shown in any Figure) was positioned forward of the perimeter of the frame, which cover plate extended radially outward so as to contain and protect the wires. The cover plate was attached to the heatsink support by way of screws that threadably engaged into holes in a front-facing, outermost annular rim 505 of the heatsink support.

Fluid-injection fittings and fluid-exhaust fittings of types similar to items 564, 565, 574 and 575 of FIG. 1 were used to direct heat-transfer fluid into, and exhaust heat-transfer fluid from, the various dynamic heat-transfer regions of the heatsink. The arrangements differed slightly from that shown in FIG. 1 in that the fittings were threadably connected to fittings that were welded to openings (similar to openings 403 and 404 of FIG. 3) provided in the backside sealing plate of the heatsink. These welded fittings were seated into heat-transfer fluid inlets and outlets (e.g., of the type exemplified by items 64, 65, 74 and 75 of FIG. 3) of the heatsink so as to be able to direct heat-transfer fluid into, and exhaust heat-transfer fluid from, the various dynamic heat-transfer regions of the rear side of the heatsink. The inlet fittings were connected to a heat-transfer fluid (in this case, compressed air) supply and the outlet fittings were configured to exhaust the spent fluid into the local environment. In the particular arrangement used, the fitting that supplied air to the innermost dynamic heat-transfer zone (e.g., the fitting that was welded to through-hold 404 of sealing plate 400 and that directed heat-transfer fluid into fluid inlet 74 of the innermost heat-transfer zone), overlapped into a portion of the third, sandwiched dynamic heat-transfer zone so that at least some heat-transfer fluid was inserted directly into that zone.

The entire apparatus, generally as shown in FIG. 1 except for the differences as noted, was attached to, and supported by, a conventional mold base of a first platen of an injection molding system (press). This first platen was a non-moving platen (thus the cavity inserts collectively corresponded to a first mold component, often referred to as an "A" side or "A" plate, of an injection molding system). The injection molding system comprised a second platen, positioned forward of the heatsink, that comprised a mold base that supported a second mold component (often referred to as a "B" side or plate) with a surface that could be brought against the cavity inserts by moving the second platen toward the first platen. The surface of the second mold component comprised runners through which molten resin could be distributed (from a central injection point supplied with molten resin from an injection-molding nozzle passing through center through-holes 517 and 77 of the heatsink support and the heatsink, respectively) to eight molding cavities, each molding cavity being defined by a molding surface of a cavity insert, along with a portion of the surface of the second mold component. The second mold component comprised eight pairs of ejector pins, each pair of pins bracketing an area of the second mold component that provided a surface of a molding cavity, whereby a molded part could be ejected from the second mold component at the end of a molding cycle.

The second mold component could be controlled to a nominal set point temperature by way of heating and cooling liquid that could be passed through channels within the second mold component in a conventional manner. The heatsink support 500 could likewise be controlled to a nominal set point by way of heating and cooling liquid that could be passed through channels within the heatsink support (e.g., by way of being introduced into the heatsink support through fluid-inlet ports 514 as shown in FIG. 1) in a conventional manner. The temperature of the heatsink main body (and the cavity inserts coupled thereto) could of course be controlled independently of these nominal setpoints.

Methods

The injection-molding system used a resin melting and injection apparatus (a reciprocating screw apparatus) obtained from KraussMaffei Technologies GmbH of München, Germany that was configured to melt a polymeric resin and to feed the molten resin into the above-described runners/molding cavities. The resin used was polycarbonate, obtained from SABIC Innovative Plastics of Pittsfield, Mass., under the trade designation Lexan HPS1R. The injection apparatus comprised a temperature at the injection barrel of approximately 288 degrees C.

The heatsink support was controlled to a generally constant nominal temperature in the range of 29-32 degrees C. by way of heating/cooling water that was circulated through the interior of the heatsink support. The second mold component (B side) was controlled to a generally constant nominal setpoint of approximately 82 degrees C., by way of heating/cooling water circulated therethrough.

For each molding cycle, the heatsink itself was first heated to a nominal setpoint of approximately 163 degrees C. This was performed with the first and second platens (and first and second mold components respectively thereof) separated (e.g., at the conclusion of a previous molding cycle). The heating was performed by supplying electric current to the front-side electrical-resistance heaters.

At the end of a time suitable for the heatsink to have been brought to a desired nominal temperature, the second (B side) mold component was brought against the first (A side) mold component so as to form eight molding cavities. The components were brought together with a pressure sufficient to prevent or minimize flashing when the molten resin was injected (noting that the press was rated at nominal 60 tons). Typically within 1-2 seconds of the mold being closed, molten resin was injected (through the aforementioned runners) into all eight cavities. At approximately the same time, the power to the electrical-resistance heaters was shut off and compressed air (at an estimated temperature in the range of 19 degrees C.) was directed into the first and second dynamic heat-transfer regions of the backside of the heatsink. The direction of airflow through the channels of the radially innermost heat-transfer region was opposite the direction of airflow for the outermost heat-transfer region. Also, the nozzle of at least one of the inlet fittings slightly overlapped into the third (radially sandwiched) heat-transfer region, so that when heat-transfer fluid was supplied through the inlet fittings at least some heat-transfer fluid was directed into this region. The spent air was exhausted into the local environment.

At the end of a cooling time suitable for the molded parts to have sufficiently solidified, the second platen was moved away from the first platen so as to separate the first and second mold components, with the molded parts typically remaining with the second mold component (until ejected therefrom by the ejector pins). The cycle could then be begun again.

By this process were produced molded plastic parts of size (exclusive of solidified material in runners etc.) approximately 13 mm diameter and 0.7 mm thickness, with numerous (dozens) of molded microfeatures protruding from one major surface thereon. The fidelity of molding of the microfeatures was excellent.

The heatsink described above was used to replace a conventional injection molding apparatus that relied on a first (A side) mold component comprising a block of copper weighing approximately 20 kg. Due at least in part to the large thermal mass of such a conventional apparatus, the molding cycles typically required approximately 70 seconds to complete. When the above-described heatsink was used, this allowed the molding cycles to be shortened to a total cycle time of typically approximately 46 seconds, with approximately 28 seconds of this being heating and approximately 18 seconds of this being cooling.

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention not merely those representative designs that were chosen to serve as exemplary illustrations. Thus, the scope of the present invention should not be limited to the specific illustrative structures described herein, but rather extends at least to the structures described by the language of the claims, and the equivalents of those structures. To the extent that there is a conflict or discrepancy between this specification as written and the disclosure in any document incorporated by reference herein, this specification as written will control.

What is claimed is:

1. An apparatus for use in injection molding, comprising: a heatsink with a main body with a base, and with a front side and a rear side and a front-rear axis and lateral axes, and with at least one load-bearing path that extends generally parallel to the front-rear axis of the heatsink so as to intersect a molding surface on the front side of the heatsink and that comprises at least a frontward segment and a rearward segment;
wherein at least a portion of at least one non-load-bearing, dynamic heat-transfer zone of the rear side of the heatsink is laterally offset from the rearward segment of the load-bearing path;
and wherein the dynamic heat-transfer zone comprises dynamic heat-transfer fins that extend generally rearward from the base of a main body of the heatsink and that collectively comprise a dynamic heat-transfer surface area, and wherein the main body of the heatsink comprises a total thermal volume, and wherein the ratio of the dynamic heat-transfer surface area to the total thermal volume is at least 1 $cm^2/cm^3$.

2. The apparatus of claim 1 wherein the rearward segment of the load-bearing path is laterally surrounded by portions of the at least one non-load-bearing, dynamic heat-transfer zone of the rear side of the heatsink.

3. The apparatus of claim 1 wherein the at least one load-bearing path is a plurality of load-bearing paths, and wherein each rearward segment of each load-bearing path is a discrete load-bearing path segment that is separated from neighboring discrete load-bearing path segments by portions of the dynamic heat-transfer zone of the heat sink.

4. The apparatus of claim 3 wherein each discrete rearward segment of each load-bearing path is provided by a load-bearing member that is attached to a main body of the heatsink.

5. The apparatus of claim 4 wherein the material of which each load-bearing member is made has a thermal conductivity that is lower than the thermal conductivity of the material of which the main body of the heatsink is made, by at least 30%.

6. The apparatus of claim 5 wherein at least a forwardmost portion of each load-bearing member is positioned within a rearwardly-open-ended receptacle that is at least partially defined by a non-load-bearing hollow sleeve that protrudes rearwardly from the main body of the heatsink and that is integral with the main body of the heatsink.

7. The apparatus of claim 1 wherein the ratio of the dynamic heat-transfer surface area of the heatsink to the total thermal volume of the main body of the heatsink is at least 4 $cm^2/cm^3$.

8. The apparatus of claim 7 wherein at least some of the dynamic heat-transfer fins comprise a height-to-thickness aspect ratio of at least 3:1.

9. The apparatus of claim 3 wherein the at least one dynamic heat-transfer zone comprises a first dynamic heat-transfer region that is located radially outward from the plurality of discrete load-bearing path segments, and a second dynamic heat-transfer region that is located radially inward from the plurality of discrete load-bearing path segments, and a third dynamic heat-transfer region that is radially sandwiched in between the first and second dynamic heat-transfer regions and along which the plurality of discrete load-bearing path segments are circumferentially spaced.

10. The apparatus of claim 1 wherein the molding surface of the front side of the heatsink comprises a projected area, and wherein the rearward segment of the load-bearing path comprises a projected area that is at least about 80% of the projected area of the molding surface.

11. The apparatus of claim 1 wherein the molding surface of the front side of the heatsink comprises a projected area, and wherein the rearward segment of the load-bearing path comprises a projected area that overlaps 100% of the projected area of the molding surface.

12. The apparatus of claim 1 wherein the front side of the heatsink comprises at least one static heat-transfer zone.

13. The apparatus of claim 12 wherein the at least one static heat-transfer zone comprises a plurality of discrete receptacles that are recessed rearward into a front side of a main body of the heatsink and that are each configured to exchange thermal energy with a static heating and/or cooling element that is positioned in the receptacle in intimate thermal contact with a surface of the main body of the heatsink.

14. The apparatus of claim 13 wherein the static heating and/or cooling elements are electrical-resistance heating elements.

15. The apparatus of claim 1 wherein the at least one load-bearing path is a plurality of load-bearing paths, and wherein the front side of the heatsink comprises a plurality of discrete molding surfaces each of which is intersected by a separate load-bearing path of the plurality of load-bearing paths of the heatsink.

16. The apparatus of claim 15 wherein each of the discrete molding surfaces is individually located on one of a plurality of discrete bosses that protrudes forwardly from a front side of a main body of the heatsink, each of which boss is a part of a frontward segment of a load-bearing path of the heatsink.

17. The apparatus of claim 16 wherein the front side of the heatsink comprises a static heat-transfer zone comprising a plurality of discrete receptacles that are recessed rearward into a front side of the main body of the heatsink and that are each configured to exchange thermal energy with a static heating and/or cooling element positioned in the receptacle in intimate thermal contact with a surface of the main body of the heatsink, and wherein the receptacles of the plurality of receptacles are circumferentially interspersed with the bosses of the plurality of discrete bosses.

18. The apparatus of claim 15 wherein each of the discrete molding surfaces is provided by a forward-facing molding surface of a cavity insert that is individually positioned on the front side of the main body of the heatsink.

19. The apparatus of claim 18 further comprising a frame that is positioned forward of the front side of the heatsink and that is attached to the heatsink so as to hold each cavity insert in position.

20. The apparatus of claim 1 wherein the at least one load-bearing path is a plurality of load-bearing paths, wherein each rearward segment of each load-bearing path is a discrete load-bearing path segment, and wherein the apparatus further comprises a heatsink support to which the heatsink is attached so that discrete, rear-facing surfaces of the rear side of the heatsink, each of which is part of a rearward, discrete load-bearing path segment of the heatsink, each contact a forward-facing surface of the heatsink support to provide a load-bearing interface therebetween.

21. The apparatus of claim 20 wherein each discrete, rear-facing surface of the rear side of the heatsink is provided by a rear-facing surface of a load-bearing member, which load-bearing member is attached to the rear side of a main body of the heatsink and is made of a material with a thermal conductivity that is lower than the thermal conductivity of the material of which the main body of the heatsink is made, by at least 30%.

22. The apparatus of claim 21 wherein the rear-facing surfaces of the plurality of load-bearing members collectively provide a load-bearing contact area with the heatsink support, and wherein the ratio of the dynamic heat-transfer surface area of the heatsink to the total load-bearing contact area of the load-bearing members is at least 20.

23. The apparatus of claim 1 wherein the molding surface comprises at least one microfeature-molding subcavity.

24. The apparatus of claim 1 wherein the molding surface comprises at least one subcavity with an aspect ratio of at least about 4:1.

25. The apparatus of claim 1 wherein the heatsink is supported by a first platen and provides a first mold component with at least one first molding surface, and wherein the apparatus further comprises a second platen that comprises a second mold component with at least one second molding surface that combines with the at least one molding surface of the first mold component to at least partially define at least one mold cavity when the first platen and the second platen are brought together.

26. The apparatus of claim 25 wherein the first platen is stationary and the second platen is movable toward the first platen into a first position in which the at least one mold cavity is defined, and away from the first platen into a second position in which a molded part can be removed from the mold cavity.

27. The apparatus of claim 26 wherein the at least one mold cavity is a plurality of discrete mold cavities and heatsink comprises at least one through-hole configured to allow a molten resin injection system to insert molten resin therethrough, and wherein the second mold component comprises runners through which the injected molten resin can be divided and distributed into the discrete molding cavities.

28. A method of injection molding, comprising:
providing a first platen that comprises a first mold component comprising a heatsink with a main body with a base, and with a front side and a rear side and a front-rear axis and lateral axes, and with at least one load-bearing path that extends generally parallel to the front-rear axis of the heatsink so as to intersect an at least one first molding surface on the front side of the heatsink and that comprises at least a frontward segment and a rearward segment;
wherein at least a portion of at least one non-load-bearing, dynamic heat-transfer zone of the rear side of the heatsink is laterally offset from the rearward segment of the load-bearing path;
and wherein the dynamic heat-transfer zone comprises dynamic heat-transfer fins that extend generally rearward from the base of a main body of the heatsink and that collectively comprise a dynamic heat-transfer surface area, and wherein the main body of the heatsink comprises a total thermal volume, and wherein the ratio of the dynamic heat-transfer surface area to the total thermal volume is at least $1\ cm^2/cm^3$;
heating the heatsink so as to cause the at least one first molding surface to be brought to a first, high temperature;
bringing a second platen together with the first platen, into a first position in which the at least one molding first surface of the first mold component, and at least one second molding surface of a second mold component supported by the second platen, combine to define at least one mold cavity that intersects the at least one load-bearing path of the heatsink;
injecting molten resin into the at least one mold cavity;
dynamically cooling the heatsink so as to cause the at least one first molding surface to be brought to a second, low temperature that is lower than the first, high temperature by at least 10 degrees C.;
allowing the resin within the at least one mold cavity to cool and solidify to form a molded part; and,
moving the first and second platens away from each other into a second position in which the molded part can be removed from the mold cavity.

29. The method of claim 28 wherein the front side of the heatsink comprises at least one static heat-transfer zone and wherein the step of heating of the heatsink is performed by one or more static heaters that are in intimate thermal contact with the heatsink.

30. The method of claim 29 wherein the at least one non-load-bearing, dynamic heat-transfer zone of the rear side of the heatsink is used only for cooling the heatsink and not for heating the heatsink.

31. The method of claim 30 wherein the step of dynamically cooling the heatsink is begun during the time that the step of using the at least one static heater to heat the heatsink is still in progress.

32. The method of claim 28 wherein the at least one non-load-bearing, dynamic heat-transfer zone of the rear side of the heatsink is used for both cooling and heating the heatsink.

33. The method of claim 28 wherein the step of bringing the second platen together with the first platen into the first position to form the mold cavity is performed after the at least one first molding surface is heated to at least the first, high temperature.

34. The method of claim 28 wherein the second mold component is controlled to a nominally constant temperature that is at least 10 degrees C. lower than the second, low temperature of the at least first molding surface of first mold component.

\* \* \* \* \*

UNITED STATES PATENT AND TRADEMARK OFFICE
CERTIFICATE OF CORRECTION

| | | |
|---|---|---|
| PATENT NO. | : 8,663,537 B2 | Page 1 of 1 |
| APPLICATION NO. | : 13/474938 | |
| DATED | : March 4, 2014 | |
| INVENTOR(S) | : Karl Stensvad | |

It is certified that error appears in the above-identified patent and that said Letters Patent is hereby corrected as shown below:

On the Title Page

Page 2, Col. 2 (Other Publications)
Line 40, Delete "Partswith Highaspect" and insert -- Parts with High aspect --, therefor.

In the Specification

Column 1
Line 23, Delete "itself" and insert -- itself. --, therefor.

Signed and Sealed this
Fourth Day of November, 2014

Michelle K. Lee
*Deputy Director of the United States Patent and Trademark Office*